(12) United States Patent
Alshawabkeh et al.

(10) Patent No.: US 11,753,321 B2
(45) Date of Patent: Sep. 12, 2023

(54) ROBUST FLOW-THROUGH PLATFORM FOR ORGANIC CONTAMINANTS REMOVAL

(71) Applicant: Northeastern University, Boston, MA (US)

(72) Inventors: Akram Alshawabkeh, Franklin, MA (US); Long Chen, Malden, MA (US)

(73) Assignee: Northeastern University, Boston, MA (US)

( * ) Notice: Subject to any disclaimer, the term of this patent is extended or adjusted under 35 U.S.C. 154(b) by 92 days.

(21) Appl. No.: 17/104,950

(22) Filed: Nov. 25, 2020

(65) Prior Publication Data

US 2021/0155514 A1 May 27, 2021

Related U.S. Application Data

(60) Provisional application No. 62/939,871, filed on Nov. 25, 2019.

(51) Int. Cl.
| | |
|---|---|
| *C02F 1/72* | (2023.01) |
| *C02F 1/461* | (2023.01) |
| *B01J 27/128* | (2006.01) |
| *B01J 21/04* | (2006.01) |
| *C02F 101/34* | (2006.01) |
| *C02F 101/30* | (2006.01) |

(52) U.S. Cl.
CPC ............ *C02F 1/725* (2013.01); *B01J 21/04* (2013.01); *B01J 27/128* (2013.01); *C02F 1/4618* (2013.01); *C02F 1/722* (2013.01); *C02F 2001/46185* (2013.01); *C02F 2101/306* (2013.01); *C02F 2101/345* (2013.01); *C02F 2201/4611* (2013.01); *C02F 2209/06* (2013.01); *C02F 2301/04* (2013.01); *C02F 2305/023* (2013.01); *C02F 2305/026* (2013.01)

(58) Field of Classification Search
CPC ..... C02F 1/72; C02F 1/46; B01J 21/04; B01J 27/128
See application file for complete search history.

(56) References Cited

FOREIGN PATENT DOCUMENTS

| | | | |
|---|---|---|---|
| CN | 105251519 A | * | 1/2016 |
| CN | 109956529 A | * | 7/2019 |

OTHER PUBLICATIONS

Acar et al., "Principles of Electrokinetic Remediation," Environmental Science & Technology, 27(13): 2638-2647 (1993).
Andre et al., "V2O5 Nanowires with an Intrinsic Peroxidase-Like Activity," Advanced Functional Materials, 21(13): 501-509 (2011).
Babuponnusami et al., "A review on Fenton and improvements to the Fenton process for wastewater treatment," Journal of Environmental Chemical Engineering: 16 pages (2013).

(Continued)

*Primary Examiner* — Walter D. Griffin
*Assistant Examiner* — Cameron J Allen
(74) *Attorney, Agent, or Firm* — Foley Hoag LLP; Dana M. Gordon; Lawrence P. Tardibono

(57) ABSTRACT

Disclosed is an electro-Fenton-like (EFL) platform wherein an electrochemically produced acidic environment supports heterogeneous Fenton-like reaction for high throughput water treatment. The platform enables treatment of contaminated water.

21 Claims, 31 Drawing Sheets

(56) References Cited

OTHER PUBLICATIONS

Bokare et al., "Review of iron-free Fenton-like systems for activating H2O2 in advanced oxidation processes," Journal of Hazardous Materials, Accepted Manuscript: 65 pages (2014).
Bolobajev et al., "Reuse of ferric sludge as an iron source for the Fenton-based process in wastewater treatment," Chemical Engineering Journal, 255: 8-13 (2014).
Brillas et al., "Electro-Fenton Process and Related Electrochemical Technologies Based on Fenton's Reaction Chemistry," Chemical Reviews, 109(12): 6570-6631 (2009).
Cheng et al., "Metal-organic frameworks for highly efficient heterogeneous Fenton-like catalysis," Coordination Chemistry Reviews, 368: 80-92 (2018).
Feng et al., "Advanced treatment of dyeing wastewater towards reuse by the combined Fenton oxidation and membrane bioreactor process," Journal of Environmental Science, 22(11): 1657-1665 (2010).
Ganiyu et al., "Coupling of membrane filtration and advanced oxidation processes for removal of pharmaceutical residues: A critical review," Separation and Purification Technology, Accepted Manuscript: 98 pages (2015).
Ganiyu et al., "Heterogeneous electro-Fenton and photoelectro-Fenton processes: A critical review of fundamental principles and application for water/wastewater treatment," Applied Catalysis B: Environmental, Accepted Manuscript: 115 pages (2018).
Gao et al., "Intrinsic peroxidase-like activity of ferromagnetic nanoparticles," Nature Nanotechnology, 2: 577-583 (2007).
Garrido-Ramirez et al., "Clays and oxide materials as catalysts and nanocatalysts in Fenton-like reactions—A Review," Applied Clay Science, 47: 182-192 (2010).
Herney-Ramirez et al., "Heterogeneous photo-Fenton oxidation with pillared clay-based catalysts for wastewater treatment: A review," Applied Catalysis B: Environmental, 98: 10-26 (2010).
Keith et al., "Geochemical models of the impact of acidic groundwater and evaporative sulfate salts on Boulder Creek at Iron Mountain, California," Applied Geochemistry, 16: 947-961 (2001).
Koppenol et al., "The Haber-Weiss cycle—71 years later," Redox Report, 7(1): 2 pages (2002).
Liu et al., "Structural Effects of Fe3O4 Nanocrystals on Peroxidase-Like Activity," Chemistry A European Journal, 17:620-625 (2011).
Lu et al., "Wastewater treatment for carbon capture and utilization," Nature Sustainability, 1: 750-758 (2018).
Moon et al., "Eco-Friendly Photochemical Production of H2O2 through O2 Reduction over Carbon Nitride Frameworks Incoporated with Multiple Heteroelements," ACS Catalysis, 7: 2886-2895 (2017).
Munoz et al., "Preparation of magnetite-based catalysts and their application in heterogeneous Fenton oxidation—A review," Applied Catalysis B: Environmental, Accepted Manuscript: 54 pages (2015).
Neyens et al., "A review of classic Fenton's peroxidation as an advanced oxidation technique," Journal of Hazardoues Materials, B98: 33-50 (2003).
Nordstrom et al., "Negative pH, efflorescent mineralogy, and consequences for environmental restoration at the Iron Mountain Superfund site, California," PNAS, 96: 3455-3462 (1999).
Pignatello et al., "Advanced Oxidation Processes for Organic Contaminant Destruction Based on the Fenton Reaction and Related Chemistry," Critical Reviews in Environmental Science and Technology, 36:1-84 (2006).
Pliego et al., "Treatment of Highly Polluted Hazardous Industrial Wastewaters by Combined Coagulation—Adsorption and High-Temperature Fenton Oxidation," Industrial & Engineering Chemistry Research, 51: 2888-2896 (2012).
Pouran et al., "Review on the advances in photo-Fenton oxidation system for recalcitrant wastewaters," Journal of Industrial and Engineering Chemistry: 17 pages (2014).
Pouran et al., "Review on the application of modified iron oxides as heterogeneous catalysts in Fenton reactions," Journal of Cleaner Production, 64: 24-35 (2014).
Sun et al., "Reinventing Fenton Chemistry: Iron Oxychloride Nanosheet for pH-Insensitive H2O2 Activation," Environmental Science & Technology Letters: 6 pages (2018).
Wardman., "Reduction Potentials of One-Electron Couples Involving Free Radicals in Aqueous Solution," Journal of Physical and Chemical Reference Data, 18: 1637-1755 (1989).
Wu et al., "Transformation of pollutants in landfill leachate treated by a combined sequence batch reactor, coagulation, Fenton oxidation and biological aerated filter technology," Process Safety and Environmental Protection, 89: 112-120 (2011).
Yi et al., "A review on research progress in the direct synthesis of hydrogen peroxide from hydrogen and oxygen: noble-metal catalytic method, fuel-cell method and plasma method," Catalysis Science & Technology, 6: 1593-1610 (2016).

* cited by examiner

ROBUST FLOW-THROUGH PLATFORM FOR ORGANIC CONTAMINANTS REMOVAL

RELATED APPLICATION

This application claims the benefit of priority to U.S. Provisional Patent Application No. 62/939,871, filed Nov. 25, 2019.

GOVERNMENT SUPPORT

This invention was made with government support under Grant Number P42ES017198 awarded by the National Institutes of Health. The government has certain rights in the invention.

BACKGROUND

Various toxic organic compounds in the environment have produced considerable threats to human health and ecosystem. While efficient in providing clean drinking water with improved quality, many advanced water treatment facilities are flawed by high capital costs and remain as the principal barrier for implementation in developing countries (Lu et al. 2018). The classic Fenton process, which transforms hydrogen peroxide ($H_2O_2$) into hydroxyl radicals (HO.) under the ferrous ions ($Fe^{2+}$) catalysis, is an affordable and proven water treatment technique (Wardman et al. 2018). HO. is the second most oxidative species with a redox potential of 2.73 V (vs NHE) after fluorine in nature (Wardman et al. 2018), and could non-selectively destroy recalcitrant and toxic organic contaminants in water (Babuponnusami et al. 2014; Pignatello et al. 2006). By coupling with other water treatment units, such as coagulation, membrane filtration, or microbial degradation, the Fenton process can be adapted for various water bodies' treatments (Feng et al. 2010; Wu et al. 2011; Ganiyu et al. 2015). Fruitful progresses have been achieved to date in Fenton chemistry for water treatment (Herney-Ramirez et al. 2010; Pouran et al. 2015; Bokare et al. 2014; Brillas et al. 2009; Ganiyu et al. 2018). In particular, in situ synthesis of $H_2O_2$ from $H_2$ and $O_2$ under noble metal catalysis (Yi et al. 2016), and $H^+$ and $O_2$ under photochemical (Moon et al. 2017), or electrochemical catalysis (Bolobajev et al. 2014) is a sustainable route to reduce the chemical cost. However, formation of the ferric sludge continues to be a challenge limiting implementation of the Fenton process. The sludge is formed when water pH is improved to around neutral after oxidation, and its toxicity stems from the adsorbed residual compounds in treated water (Bolobajev et al. 2014). Treatment of the ferric sludge requires substantial chemical and manpower costs—10% to 50% of overall operating costs in a water treatment plant (Pilego et al. 2012; Neyens et al. 2003).

Heterogeneous solid catalysts could potentially overcome the drawback of ferric sludge formation. Naturally occurring clays/minerals as well as transition metal-centered designer composites have been extensively explored as Fenton-like catalyst (Herney-Ramirez et al. 2012; Garrido-Ramirez et al. 2010; Cheng et al. 2018; Munos et al. 2015; Pouran et al. 2014). These catalysts have noteworthy structural elegance in the unique coordination environment of their metal cores, which stabilizes the metal-$H_2O_2$ complex transition state and facilitates the electron transfer inter se (Sun et al. 2018). Furthermore, the turnover of metal atoms on the catalyst surface occurs via a peroxidase-mimicking mechanism (Gao et al. 2007), akin to the Haber-Weiss reaction of homogeneous Fenton chemistry (Koppenol et al. 2001). The pH-dependence of heterogeneous Fenton-like catalysts is generally less strict than that of iron ions, the latter of which is most effective in pH 2.8-3.5 (Cheng et al. 2018). Nevertheless, most canonical Fenton-like catalysts favor acidic pH 3-5 (Table 1), and catalysts turnover frequency (TOF) can be reduced by up to 100 folds under neutral condition (Liu et al. 2011; André et al. 2011). This is due to surface metal-OH complexes forming at higher pH values and repelling $H_2O_2$ away from the exposed active sites. However, pH regulation of near-neutral drinking water bodies is challenging, especially if the water contains high carbonate alkalinity; furthermore, acidification of contaminated groundwater for in situ water treatment could release undesired metal ions from aquifers (Keith et al. 2001; Nordstrom et al. 1999). These concerns severely compromise the potential use of heterogeneous Fenton-like catalysts in the water treatment industry.

Flow electrochemistry holds great potential for automatic pH regulation to support water treatment, wherein $OH^-$ and $H^+$ generated from the cathode and anode, respectively, are redistributed based on ion migration, dispersion, and hydraulic flux (Acar et al. 2011).

SUMMARY OF INVENTION

One aspect of the present invention provides a process for treating contaminated water, comprising contacting said contaminated water with hydrogen peroxide in the presence of an iron oxychloride catalyst, wherein the process occurs in the absence of an acid.

Another aspect of the invention provides a process for treating contaminated water, comprising: (i) adding hydrogen peroxide to the contaminated water; (ii) providing an influent stream of the contaminated water into a chamber comprising an upstream anode, a downstream cathode, and an iron oxychloride catalyst between the anode and cathode; (iii) applying an electric current to the chamber to provide an acidic environment in the chamber so as to thereby treat the contaminated water in the chamber; and (iv) collecting an effluent stream of the treated water exiting the chamber.

Also provided herein is a process for treating contaminated water, comprising contacting said contaminated water with hydrogen peroxide in the presence of an iron oxychloride catalyst, wherein the process occurs in the absence of an acid, wherein the treating comprises removal of bisphenol A from the water.

Also provided herein is a process for treating contaminated water, comprising: (i) adding hydrogen peroxide to the contaminated water; (ii) providing an influent stream of the contaminated water into a chamber comprising an upstream anode, a downstream cathode, and an iron oxychloride catalyst between the anode and cathode; (ii) applying an electric current to the chamber to provide an acidic environment in the chamber so as to thereby treat the contaminated water in the chamber; and (iv) collecting an effluent stream of the treated water exiting the chamber, wherein the treating comprises removal of bisphenol A from the water.

BRIEF DESCRIPTION OF THE DRAWINGS

FIG. 17C: Quantification of generated HO. radical by electro-Fenton-like platform as the electric current was turned off and on;

DETAILED DESCRIPTION OF THE INVENTION

Figure 1A:
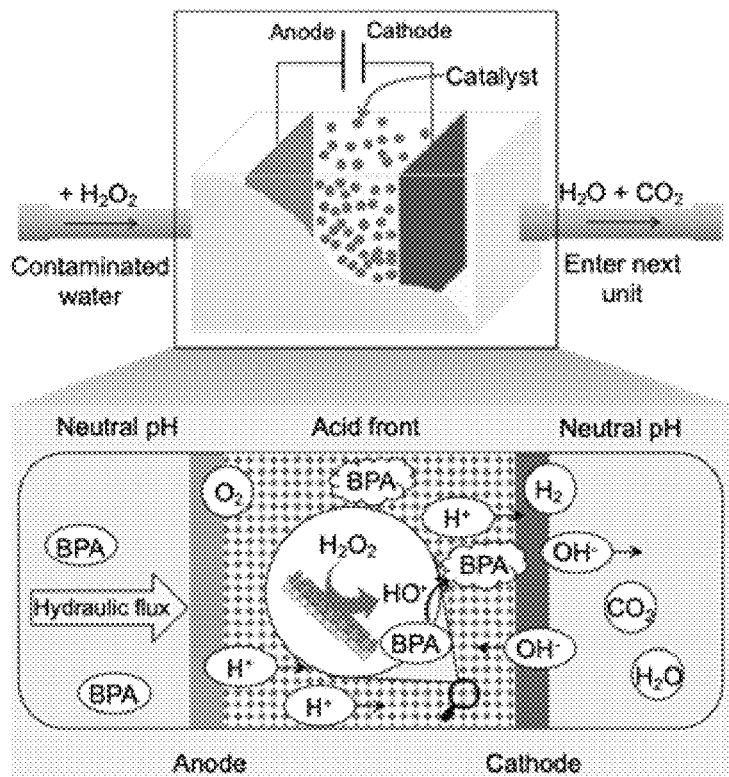
FIG. 1A: Electrolytically localized acid-compartment process-based flow-through water treatment platform (Ella process). Schematic representation of the flow-through platform. Placement of an anode upstream of a cathode produces an acid front, which promotes the activity of immobilized Fenton-like catalyst. The $H_2O_2$ is in situ transformed into HO. radical under catalysis, leading to oxidative mineralization of organic contaminant into $CO_2$ and $H_2O$. Bisphenol A (BPA) is used as a target compound for illustration purpose.

The present invention relates to a Fenton-like water treatment process that bypasses the need of acid and generation of iron sludge precipitate, and makes the process more widely applicable to various conditions. This Fenton-like process is greener and more cost-effective than current methods.

Toxic organic compounds in water severely threaten drinking water safety, and require effective pretreatment. Hydroxyl radical produced by Fenton process ($Fe^{2+}/H_2O_2$) can non-selectively destroy organic contaminants based on its strong oxidation potential. An upgraded reaction utilizing heterogeneous solid catalysts, called Fenton-like process, was recently adopted to overcome ferric sludge precipitation of Fenton process. However, most heterogeneous Fenton-like catalysts operate optimally at pH 3-5, which acidity is challenging to create in near-neutral water bodies. The Ella process produced by electrochemical water splitting under flow-through conditions to facilitate the heterogeneous Fenton-like reaction. This Ella process boosted the activity of an immobilized iron oxychloride catalyst by over ten-fold in terms of hydroxyl radical yield, leading to near 100% destruction of various organic pollutants under high-throughput treatments. The robust performance in complex water bodies further highlights the promise of this scalable platform.

The Ella process uses a high-performance iron oxychloride nanocatalyst instead of free iron ion, an acid compartment induced by electrolysis instead of addition of acid. The immobilized iron oxychloride nanocatalyst is confined to the acid compartment.

The advantages of the Ella process include the ability to treat water contaminants in neutral solution without the addition of acids, prevent the generation of iron sludge waste as a secondary pollutant, and a simple operating procedure (i.e. by simply switching the electricity from the power supply). Also, the preparation of catalysts and induction of acid compartment are more cost-effective than previous homogeneous Fenton process, and contaminated water can be treated with high efficiency and robustness against complex water chemistry. Avoidance of secondary pollutants, and treatment of secondary contamination also provides a cost reduction.

The Ella process can be used in an advanced oxidation process in water treatment plants to replace the currently prevalent homogeneous Fenton process. The process can be used for water decontamination and disinfection of most surface water and groundwater as well as complex water bodies, such as industrial wastewater.

Definitions

The term "contaminated water" as used herein refers to water containing one or more contaminants or pollutants. The contaminants or pollutants include, but are not limited to, organic contaminants or pollutants. The organic contaminants or pollutants include but are not limited to, drugs (e.g., ibuprofen and carbamazepine), drug precursors (e.g., 4-chlorophenol and 4-nitrophenol), plastic precursors (e.g., bisphenol A), herbicides (e.g., atrazine), pesticides, or recalcitrant dyes (e.g., rhodamine B, reactive blue 19, and orange II).

The term "iron oxychloride catalyst" as used herein refers to a FeOCl catalyst which is effective in catalyzing the production of hydroxyl radical (HO') from hydrogen peroxide ($H_2O_2$). In the first step of the process of producing hydroxyl radical, $Fe^{III}OCl$ is reduced by $H_2O_2$ into $Fe^{II}OCl$, and in the second step the derived $Fe^{II}OCl$ then decomposes $H_2O_2$ into HO. radical via homolytic cleavage.

Although this invention demonstrates that iron oxychloride as a catalyst is powerful to treat pollutants, any other active Fenton-like catalyst can be used herein for water treatment.

In certain embodiments, any active Fe-based Fenton-like catalyst can be used herein for water treatment.

In certain embodiments, any active Mn-, Cu-, Co-, or Ni,-based Fenton-like catalyst can be used herein for water treatment.

Any catalyst listed in below Table 1, e.g., $Fe_3O_4$, $KFePW_{12}O_{40}$, $H_3PW_{12}O_{40}$, $FA-Fe_2SiW_{10}$, $V_2O_5$, Nanoceria, $Co_3O_4$, $MnFe_2O_4$, ferrocene, $Ag_3PO_4$, nanodiamond—gold nanocomposites, MOF-88, nitrogen-doped graphene quantum dots, Carboxyl-modified graphene oxide, H@M, Cubic Pt nanocrystal, Rh NS, $MoS_2$ NS, $MoSe_2$ NS, WΩ NS, $WSe_2$ NS, ZIF-67, Cu-MOF, $Fe_2O_3$, 2LFh, PdCu, $Co_9S_8$, $Cu(OH)_2$ SC, Ru frame, FePt—Au HNP, PtAg—$MoS_2$, PtPd NP, Cu-hemin, PS@Au@PB, and Cu NC, is useful in the disclosed treatment process.

Additional catalysts are also useful in the disclosed treatment process including ferrihydrites (e.g., 8% Ag/AgBr/Fh and 6% Ag/AgCl/Fh), ferrites (e.g., $ZnFe_2O_4$), pillared clays (e.g., Al—Fe smectite pillared clay), layered double hydroxides (e.g., CuNiFe LDH), Fe-Perovskites (e.g., $LaCuxFe_{t-x}O_{3-\delta}$ (x=0.5)), graphene related materials (e.g., $Fe_3O_4$—$Mn_3O_4$/reduced graphene oxide), $g-C_3N_4$ composites (e.g., Fe-g-$C_3N_4$/graphitised mesoporous carbon and 5% Fe-doped g-$C_3N_4$), metal-organic frameworks (MOFs) and composites (e.g., $TiO_2$ @$NH_2$-MIL88B-Fe), and zero-valent iron (ZVI) based catalysts (e.g., nano-ZVI@kaolinite) (see Thomas et al. 2021).

In certain embodiments, a Fenton-like catalyst which is active at acidic pH can be used for water treatment. In some embodiments, a Fenton-like catalyst which is active at pH 2-4 can be used for water treatment.

In certain embodiments, the Fenton-like catalyst is immobilized. In some embodiments, the Fenton-like catalyst is immobilized onto a support. The immobilization method is not limited to the disclosed methods, e.g., melt infiltration method. For example, ball milling can also be used as the immobilization method.

TABLE 1

Summary of heterogeneous Fenton-like catalysts owning peroxidase-mimicking functions in literature.

| Catalyst | Activity | Optimum pH | Synthesis method | Reference |
|---|---|---|---|---|
| Horseradish peroxidase (HRP) | TMB: $K_m = 0.434$ mM, $V_{max} = 10 \times 10^{-8}$ M s$^{-1}$, $k_{cat} = 0.4 \times 10^4$ s$^{-1}$; $H_2O_2$: $K_m = 3.7$ mM, $V_{max} = 8.71 \times 10^{-8}$ M s$^{-1}$, $k_{cat} = 0.348 \times 10^3$ s$^{-1}$; | 4 | Genetically encoded | Gao et al. 2007 |
| $Fe_3O_4$ | TMB: $K_m = 0.098$ mM, $k_{cat} = 3.02 \times 10^4$ s$^{-1}$; $H_2O_2$: $K_m = 154$ mM, $k_{cat} = 8.58 \times 10^4$ s$^{-1}$ | 3.5 | Solvothermal method, co-precipitation method | Gao et al. 2007; Deng et al. 2005; Ma et al. 2004; |
| $KFePW_{12}O_{40}$ | TMB: $K_m = 0.346$ mM, $V_{max} = 3.7 \times 10^{-8}$ M s$^{-1}$; $H_2O_2$: $K_m = 165$ mM, $V_{max} = 6.9 \times 10^{-8}$ M s$^{-1}$ | 4.5 | 1) Synthesis of $K_3PW_{12}O_{40}$ through hydrothermal treatment of KCl and $H_3[PW_{12}O_{40}]$; 2) iron ion exchange with $K^+$ | Zeb et al. 2018 |
| $H_3PW_{12}O_{40}$ | TMB: $K_m = 0.11$ mM, $V_{max} = 43.1 \times 10^{-8}$ M s$^{-1}$; $H_2O_2$: $K_m = 15.89$ mM, $V_{max} = 42400 \times 10^{-8}$ M s$^{-1}$ | 3 | N.A. | Wang et al. 2012 |
| FA—$Fe_2SiW_{10}$ | $H_2O_2$: $K_m = 0.014$ mM, $V_{max} = 14.24 \times 10^{-8}$ M s$^{-1}$ | 4 | Co-precipitation method | Sun et al. 2013 |
| $V_2O_5$ | TMB: $K_m = 0.165$ mM, $V_{max} = 2.4 \times 10^{-8}$ M s$^{-1}$; $H_2O_2$: $K_m = 0.058$ mM, $V_{max} = 1.4 \times 10^{-8}$ M s$^{-1}$ | 4 | Hydrothermal method | Qu et al. 2014 |
| Nanoceria | TMB: $K_m = 3.8$ mM, $V_{max} = 70 \times 10^{-8}$ M s$^{-1}$ | 4 | Solution reaction at room temperature | Asati et al. 2009 |
| $Co_3O_4$ | TMB: $K_m = 0.037$ mM, $V_{max} = 6.27 \times 10^{-8}$ M s$^{-1}$; $H_2O_2$: $K_m = 140$ mM, $V_{max} = 12.1 \times 10^{-8}$ M s$^{-1}$ | 6 | Heating and precipitation | Mu et al. 2012 |
| $MnFe_2O_4$ | TMB: $K_m = 0.112$-$0.543$ mM, $V_{max} = (3.53$-$69.8) \times 10^{-4}$ M s$^{-1}$; $H_2O_2$: $K_m = 0.00146$-$0.0964$ mM, $V_{max} = (5.15$-$71.5) \times 10^{-4}$ M s$^{-1}$ | 3.5 | Heating and precipitation | Peng et al. 2015 |
| Ferrocene | TMB: $K_m = 0.13$ mM, $V_{max} = 4.79 \times 10^{-9}$ M s$^{-1}$, $k_{cat} = 4.79 \times 10^{-3}$ s$^{-1}$; $H_2O_2$: $K_m = 50.08$ mM, $V_{max} = 9.77 \times 10^{-9}$ M s$^{-1}$, $k_{cat} = 9.77 \times 10^{-3}$ s$^{-1}$; | 3 | Commercially available | Wang et al. 2018 |
| $Ag_3PO_4$ | TMB: $K_m = 0.327$ mM, $V_{max} = 2.01 \times 10^{-8}$ M s$^{-1}$; $H_2O_2$: $K_m = 0.216$ mM, $V_{max} = 1.27 \times 10^{-8}$ M s$^{-1}$ | 2.5 | Solution reaction at room temperature | Liu et al. 2014 |
| Nanodiamond-g nanocomposites | OPD: $K_m = 6.4$-$48.7$ mM, $k_{cat} = 290.4$-$319.3$ mM s$^{-1}$ mg$^{-2}$; $H_2O_2$: $K_m = 89.7$-$208.7$ mM, $k_{cat} = 377.6$-$565.6$ mM s$^{-1}$ mg$^{-2}$; | N.A. | Solution reduction and heating | Kim et al. 2016 |
| MOF-88 | TMB: $K_m = 0.0796$ mM, $V_{max} = 3.12 \times 10^{-8}$ M s$^{-1}$; $H_2O_2$: $K_m = 1.06$ mM, $V_{max} = 1.39 \times 10^{-8}$ M s$^{-1}$ | 3 | Heating and precipitation | Zheng et al. 2016 |
| Nitrogen-doped graphene quantum dots | TMB: = $11.19$ mM, $V_{max} = 0.38 \times 10^{-8}$ M s$^{-1}$; $H_2O_2$: $K_m = 0.1$ mM, $V_{max} = 0.14 \times 10^{-8}$ M s$^{-1}$ | 3 | Acid treatment of graphene oxide | Lin et al. 2015 |
| Carboxyl-modified graphene oxide | TMB: $K_m = 0.0237$ mM, $V_{max} = 3.45 \times 10^{-8}$ M s$^{-1}$; $H_2O_2$: $K_m = 3.99$ mM, $V_{max} = 3.85 \times 10^{-8}$ M s$^{-1}$ | 4 | $KMnO_4$ oxidation of graphene oxide | Song et al. 2010 |
| H@M | TMB: $K_m = 10.9$ mM, $V_{max} = 8.98 \times 10^{-8}$ M s$^{-1}$; | 5 | Impregnation of hemin into MOF | Qin et al. 2013 |

TABLE 1-continued

Summary of heterogeneous Fenton-like catalysts owning peroxidase-mimicking functions in literature.

| Catalyst | Activity | Optimum pH | Synthesis method | Reference |
|---|---|---|---|---|
| | $H_2O_2$: $K_m$ = 0.068 mM, $V_{max}$ = 6.07 × 10$^{-8}$ M s$^{-1}$ | | | |
| Cubic Pt nanocrystal | N.A. | 3.4 | Solution reduction and heating | Ma et al. 2011 |
| Rh NS | TMB: $K_m$ = 0.264 mM, $V_{max}$ = 12.56 × 10$^{-8}$ M s$^{-1}$, $k_{cat}$ = 8.2 × 10$^4$ s$^{-1}$; $H_2O_2$: $K_m$ = 4.51 mM, $V_{max}$ = 68.09 × 10$^{-8}$ M s$^{-1}$, $k_{cat}$ = 44.5 × 10$^4$ s$^{-1}$; | 4 | Solution reduction and heating | Cai et al. 20118 |
| MoS$_2$ NS | TMB: $K_m$ = 0.525 mM, $V_{max}$ = 5.16 × 10$^{-8}$ M s$^{-1}$; $H_2O_2$: $K_m$ = 0.0116 mM, $V_{max}$ = 4.29 × 10$^{-8}$ M s$^{-1}$ | 2-7.5 | Solution-based exfoliation | Lin, Zhong et al. 2014 |
| MoSe$_2$ NS | TMB: $K_m$ = 0.014 mM, $V_{max}$ = 0.56 × 10$^{-8}$ M s$^{-1}$; $H_2O_2$: $K_m$ = 0.155 mM, $V_{max}$ = 0.99 × 10$^{-8}$ M s$^{-1}$ | 3.5 | Liquid exfoliation method | Wu et al. 2018 |
| WS$_2$ NS | TMB: $K_m$ = 1.83 mM, $V_{max}$ = 4.31 × 10$^{-8}$ M s$^{-1}$; $H_2O_2$: $K_m$ = 0.24 mM, $V_{max}$ = 4.52 × 10$^{-8}$ M s$^{-1}$ | 2-7 | Commercially available | Lin et al. 2014 |
| WSe$_2$ NS | TMB: $K_m$ = 0.0433 mM, $V_{max}$ = 1.43 × 10$^{-8}$ M s$^{-1}$; $H_2O_2$: $K_m$ = 19.53 mM, $V_{max}$ = 2.22 × 10$^{-8}$ M s$^{-1}$ | 3.5 | Liquid exfoliation method | Chen, Wu et al. 2018 |
| ZIF-67 | TMB: $K_m$ = 13.69 mM, $V_{max}$ = 0.35 × 10$^{-8}$ M s$^{-1}$; $H_2O_2$: $K_m$ = 3.52 mM, $V_{max}$ = 0.28 × 10$^{-8}$ M s$^{-1}$ | <4 | Heating and precipitation | Wang, Xu et al. 2018 |
| Cu-MOF | TMB: $K_m$ = 4.11 mM, $V_{max}$ = 55.56 × 10$^{-8}$ M s$^{-1}$; $H_2O_2$: $K_m$ = 6.41 mM, $V_{max}$ = 10.2 × 10$^{-8}$ M s$^{-1}$ | 4 | Solution reaction at room temperature | Wang, Gao et al. 2018 |
| Fe$_2$O$_3$ | NP: $K_m$ = 36.82 mg/L, $V_{max}$ = 1.36 mg/min, $k_{cat}$ = 0.273 min$^{-1}$ | 8 | Solution reaction at room temperature | Pariona et al. 2016 |
| 2LFh | NP: $K_m$ = 46.67 mg/L, $V_{max}$ = 1.17 mg/min, $k_{cat}$ = 0.234 min$^{-1}$ | 8 | Solution reaction at room temperature | Pariona et al. 2016 |
| PdCu | TMB: $K_m$ = 0.25 mM, $V_{max}$ = 1.19 × 10$^{-8}$ M s$^{-1}$, $k_{cat}$ = 20.2 × 10$^{-5}$ s$^{-1}$; $H_2O_2$: $K_m$ = 3.05 mM, $V_{max}$ = 6.25 × 10$^{-6}$ M s$^{-1}$, $k_{cat}$ = 10.61 × 10$^{-2}$ s$^{-1}$; | 4 | Microwave-assisted wet-chemical synthetic approach | He et al. 2018 |
| Co$_9$S$_8$ | TMB: $K_m$ = 1.64 mM, $V_{max}$ = 99 × 10$^{-8}$ M s$^{-1}$; $H_2O_2$: $K_m$ = 7.39 mM, $V_{max}$ = 35 × 10$^{-8}$ M s$^{-1}$ | 3 | Heating and precipitation | Mu et al. 2018 |
| Cu(OH)$_2$ SC | TMB: $K_m$ = 2.448 mM, $V_{max}$ = 44.83 × 10$^{-8}$ M s$^{-1}$; $H_2O_2$: $K_m$ = 0.199 mM, $V_{max}$ = 42.51 × 10$^{-8}$ M s$^{-1}$ | 4.5 | Solution reaction at room temperature | Cai et al. 2015 |
| Ru frame | TMB: $K_m$ = 0.0603 mM, $V_{max}$ = 13.4 × 10$^{-8}$ M s$^{-1}$; $H_2O_2$: $K_m$ = 318 mM, $V_{max}$ = 7.41 × 10$^{-8}$ M s$^{-1}$ | 0-12 | Heating and precipitation | Ye et al. 2016 |
| FePt-Au HNP | TMB: $K_m$ = 0.445 mM, $V_{max}$ = 24.67 × 10$^{-8}$ M s$^{-1}$; $H_2O_2$: $K_m$ = 0.0185 mM, $V_{max}$ = 0.6894 × 10$^{-8}$ M s$^{-1}$ | 4 | Hydrothermal method | Ding et al. 2018 |
| PtAg-MoS$_2$ | TMB: $K_m$ = 25.71 mM, $V_{max}$ = 7.29 × 10$^{-8}$ M s$^{-1}$; $H_2O_2$: $K_m$ = 0.386 mM, $V_{max}$ = 3.22 × 10$^{-8}$ M s$^{-1}$ | 4 | Heating and precipitation | Cai et al. 2016 |
| PtPd NP | TMB: $K_m$ = 1.78 mM, $V_{max}$ = 36.4 × 10$^{-8}$ M s$^{-1}$; $H_2O_2$: $K_m$ = 0.053 mM, $V_{max}$ = 9.26 × 10$^{-8}$ M s$^{-1}$ | 9.5 | Reduction and mild heating | Jiang et al. 2016 |
| Cu-hemin | TMB: $K_m$ = 1.42 mM, $V_{max}$ = 26.22 × 10$^{-8}$ M s$^{-1}$; $H_2O_2$: $K_m$ = 2.18 mM, $V_{max}$ = 116 × 10$^{-8}$ M s$^{-1}$ | 6 | Reduction and mild heating | Liu et al. 2016 |

TABLE 1-continued

Summary of heterogeneous Fenton-like catalysts owning peroxidase-mimicking functions in literature.

| Catalyst | Activity | Optimum pH | Synthesis method | Reference |
|---|---|---|---|---|
| PS@Au@PB | TMB: $K_m$ = 1.22 mM, $V_{max}$ = 59 × 10$^{-8}$ M s$^{-1}$; $H_2O_2$: $K_m$ = 0.17 mM, $V_{max}$ = 38.9 × 10$^{-8}$ M s$^{-1}$ | 5.2 | Solution reaction at room temperature | Zhang et al. 2016 |
| Cu NC | TMB: $K_m$ = 0.648 mM, $V_{max}$ = 5.96 × 10$^{-8}$ M s$^{-1}$; $H_2O_2$: $K_m$ = 29.16 mM, $V_{max}$ = 4.22 × 10$^{-8}$ M s$^{-1}$ | 6 | Solution reaction and mild heating | Hu et al. 2016 |

Exemplary Embodiments of the Invention

The present invention provides a process for treating contaminated water with hydrogen peroxide in the presence of a Fenton-like catalyst (e.g., an iron oxychloride catalyst). The process degrades the contaminants in the water to benign constituents. The process enables water treatment in the absence of acid.

Embodiments of the invention are described below:

In certain embodiments, a process for treating contaminated water, comprising contacting said contaminated water with hydrogen peroxide in the presence of a Fenton-like catalyst, wherein the process occurs in the absence of an acid.

In certain embodiments, a process for treating contaminated water, comprising contacting said contaminated water with hydrogen peroxide in the presence of an iron oxychloride catalyst, wherein the process occurs in the absence of an acid.

In certain embodiments, the contaminated water is subjected to an electric current. In certain embodiments, the contaminated water is subjected to an electric current of about 100 mA.

In certain embodiments, the contaminated water subjected to the electric current attains a pH of about 2 to about 4. In certain embodiments, the contaminated water subjected to the electric current attains a pH of about 2.9 to about 3.2. In certain embodiments, the contaminated water subjected to the electric current attains a pH of about 3.

In certain embodiments, the iron oxychloride catalyst is a FeOCl/Al$_2$O$_3$ composite. In certain embodiments, the iron oxychloride catalyst is immobilized on a support. In certain embodiments, the iron oxychloride catalyst is immobilized on a γ-Al$_2$O$_3$ support. In certain embodiments, FeOCl nanoparticles are immobilized on a porous γ-Al$_2$O$_3$ In certain embodiments, the hydrogen peroxide is converted to hydroxy radicals. In certain embodiments, the hydroxy radical is the species that reacts with the contaminant(s), causing degradation of the contaminant(s).

In certain embodiments, a process for treating contaminated water, comprising:
(i) adding hydrogen peroxide to the contaminated water;
(ii) providing an influent stream of the contaminated water into a chamber comprising an upstream anode, a downstream cathode, and Fenton-like catalyst between the anode and cathode;
(iii) applying an electric current to the chamber to provide an acidic environment in the chamber so as to thereby treat the contaminated water in the chamber; and
(iv) collecting an effluent stream of the treated water exiting the chamber.

In certain embodiments, the treatment occurs in the absence of acid, i.e., acid is not added at any step of the process.

In certain embodiments, a process for treating contaminated water, comprising:
(i) adding hydrogen peroxide to the contaminated water;
(ii) providing an influent stream of the contaminated water into a chamber comprising an upstream anode, a downstream cathode, and an iron oxychloride catalyst between the anode and cathode;
(iii) applying an electric current to the chamber to provide an acidic environment in the chamber so as to thereby treat the contaminated water in the chamber; and
(iv) collecting an effluent stream of the treated water exiting the chamber.

In certain embodiments, the treatment occurs in the absence of acid, i.e. acid is not added at any step of the process.

In certain embodiments, the influent stream of contaminated water is at neutral pH. In certain embodiments, the influent stream of contaminated water has a pH of about 7 to about 8.

In certain embodiments, the effluent stream of treated water is at neutral pH. In certain embodiments, the influent stream of contaminated water has a pH of about 7 to about 8.

In certain embodiments, the contaminated water in the chamber is at an acidic pH. In certain embodiments, the pH of the contaminated water in the chamber is about 2 to about 4. In certain embodiments, the pH of the contaminated water in the chamber is about 2.9 to about 3.2. In certain embodiments, the pH of the contaminated water in the chamber is about 3.

In certain embodiments, anode and cathode are mixed metal oxide electrodes. In certain embodiments, the electric current is about 100 mA. In certain embodiments, the electric current enables an acidic pH between the anode and cathode to be attained at steady state.

In certain embodiments, the iron oxychloride catalyst is a FeOCl/Al$_2$O$_3$ composite. In certain embodiments, the iron oxychloride catalyst is immobilized on a support. In certain embodiments, the iron oxychloride catalyst is immobilized on a γ-Al$_2$O$_3$ support. In certain embodiments, FeOCl nanoparticles are immobilized on a porous γ-Al$_2$O$_3$ In certain embodiments, the hydrogen peroxide is converted to hydroxy radicals inside the chamber. In certain embodiments, the hydroxy radical is the species that reacts with the contaminant(s), causing degradation of the contaminant(s). In certain embodiments, the concentration of hydroxy radicals in the chamber is greater than 250 μM.

In certain embodiments, the flow rate of the water through the chamber is less than 30 mL/min. In certain embodiments, the flow rate of the water through the chamber is about 10 to about 25 mL/min. In certain embodiments, the flow rate of the water through the chamber is about 10 to about 20 mL/min. In certain embodiments, the flow rate of the water through the chamber is about 15 mL/min.

In certain embodiments, the flow rate of the water through the chamber is 30-50 mL/min. In certain embodiments, the flow rate of the water through the chamber is 50-100 mL/min. In certain embodiments, the flow rate of the water through the chamber is 100-500 mL/min. In certain embodiments, the flow rate of the water through the chamber is 500-1000 mL/min.

In certain embodiments, the treating comprises purification of the water by removal of contaminants from the water. In certain embodiments, the treating comprises removing one or more contaminants from the water. In certain embodiments, the treating comprises removing one or more organic contaminants from the water. In certain embodiments, the treating comprises removing one or more drugs, drug precursors, plastic precursors, herbicides, pesticides, or recalcitrant dyes from the water.

In certain embodiments, the treating comprises removing bisphenol A (BPA) from the water. In certain embodiments, the treating comprises removing greater than 99% of the bisphenol A (BPA) present in the water prior to treatment of the water. In certain embodiments, the treating comprises removing greater than 95% of the bisphenol A (BPA) present in the water prior to treatment of the water. In certain embodiments, the treating comprises removing greater than 90% of the bisphenol A (BPA) present in the water prior to treatment of the water. In certain embodiments, the treating comprises removing greater than 80% of the bisphenol A (BPA) present in the water prior to treatment of the water.

In certain embodiments, the contaminant(s) is degraded to carbon dioxide and water. In certain embodiments, the bisphenol A (BPA) is degraded to carbon dioxide and water.

Chemicals $FeCl_3.6H_2O$ (Honeywell Fluka) was used to synthesize the FeOCl nanocatalyst, and $H_2O_2$ was purchased from Fisher Scientific. $\gamma$-$Al_2O_3$(Alfa Aesar) was used as a support to immobilize FeOCl. BPA (Sigma-Aldrich), ibuprofen (Alfa Aesar), atrazine (Sigma-Aldrich), carbamazepine (Sigma-Aldrich), 4-chlorophenol (Acros Organics), 4-nitrophenol (Acros Organics), Rhodamine B (Harleco, Philadelphia, Pa.), Reactive blue 19 (Sigma-Aldrich), and Orange II (Acros Organics) were used as substrates for Fenton-like process treatment. Other chemicals (i.e., sodium sulfate ($Na_2SO_4$) as the supporting electrolyte, sodium carbonate ($Na_2CO_3$) for synthetic alkaline water, ethanol as a HO. radical scavenger, methanol and acetonitrile as mobile phase for HPLC) were purchased from Fisher Scientific. Pure water was used throughout the work except the field water studies.

Synthesis of FeOCl 2 g grinded $FeCl_3.6H_2O$ powder was put at the bottom of a ceramic crucible, and then tightly sealed with aluminum foil. The crucible was heated at an 8° C./min rate until up to 200° C. and maintained for 2 h in a muffle furnace. After heating, the crucible was naturally cooled down to room temperature. The cooling process took around 1 h. The formed dark red FeOCl plates were ground into fine powder and then washed with ethanol at least for three times until eluent was colorless to remove residual $FeCl_3$ impurity. Eventually, the synthesized and purified FeOCl was stored in a dry 15-mL Corning tube, and then put in a chemical fume hood under constant ventilation drying.

Synthesis of $FeOCl/Al_2O_3$ 10 g grinded $\gamma$-$Al_2O_3$ microparticles were mixed with 5.97 g $FeCl_3.6H_2O$ (i.e., theoretical 10 wt % Fe loading) under vigorous vortex for 10 min until the powder mixture turned homogeneously yellow. The powder was then transferred into 5-mL glass tubes with air-tight caps and further sealed with Teflon bands to prevent vaporization of crystalline water in $FeCl_3.6H_2O$. The glass tubes were heated under 80° C. for 12 h, during which $FeCl_3.6H_2O$ (melting point 37° C.) infiltrated into $\gamma$-$Al_2O_3$ pores. The obtained powder was transferred into crucibles for the synthesis of $FeOCl/Al_2O_3$ using the same condition as FeOCl synthesis. Produced $FeOCl/Al_2O_3$ was extensively washed with ethanol before use.

Synthesis of FeOCl on Alginate Hydrogel 1.5 g synthesized FeOCl and 3 g alginate were at first sufficiently mixed via vigorous vortex, and then 100 mL DI water was poured into the beaker containing well-mixed FeOCl and alginate. A clean glass stick was used to stir the solution until it turned into homogeneous red paste. A syringe was then used to drop the red slurry into 0.1 M $CaCl_2$) solution, and formed FeOCl/alginate beads were allowed to harden for 2 h. The as-prepared FeOCl/alginate beads were then washed with DI water and loaded into the reactor for subsequent experiments.

Characterization of Materials

The crystalline phase of samples was measured using a D/MAX-2200 X-ray diffraction (XRD) analyzer equipped with a rotation anode using CuKa radiation ($\lambda$=0.1541 nm). Field emission scanning electron microscope (FESEM) photography was performed on an S-4800 instrument at an accelerating voltage of 15 kV. High resolution transmission electron microscopy (HRTEM) images were obtained on a JEOL JEM-2100F transmission electron microscope at an accelerating voltage of 200 kV. The chemical composition and the binding states on the surface of the FeOCl specimen were carried out on a Thermo Scientific ESCALAB 250 Xi X-ray photoelectron spectroscopy (XPS) microprobe with monochromatic X-ray (Al K$\alpha$, 1486.6 eV) radiation as an excitation source. The measurements of specific surface area, pore volume, and pore size distribution in the 2-500 nm range were carried out using a Micromeritics ASAP 2020 instrument by nitrogen adsorption/desorption at 77.3 K (−194.85° C.).

EFL Platform Loading Unimmobilized FeOCl 5 g FeOCl powder was mixed well with 50 g sand particles under vortex for 20 min, and the mixture was then filled in between the cathode and anode, and all other spaces were filled with sand particles to reduce hydrodynamic perturbation. A neutral solution containing 10 mM $H_2O_2$, 10 µM BPA, and 5 mM $Na_2SO_4$ as electrolyte was pumped up into the vertically aligned reactor at a rate of 15 mL/min. A steady-state acidic-compartment was formed between the cathode and anode under a current of 100 mA after 60 min, and BPA removals at each sampling port was tested.

Flow-Through Column Reaction

The experimental column (15 cm×5 cm O.D., 0.32 cm wall thickness) is made with cast acrylic tube and Teflon rods with O-rings as the top and bottom cap. Mixed metal oxide sintered titanium (Ti/MMO) mesh electrodes were inserted in parallel at a distance of 9 cm. Titanium hex nuts and threaded rods were used to connect Ti/MMO electrodes with electric power source. Gum rubber was sealed on the external titanium rod to avoid contact with both electrodes.

Four sampling ports using tube adapter (0.79375 cm tube to 0.3175 cm NPT male) were installed at an equal distance (3 cm) between the electrodes.

To load catalysts into the reactor, the $FeOCl/Al_2O_3$ catalyst (~50 g) was filled between the cathode and anode, and rest spaces were filled with fine silica sand particles. The silica sand particles were extensively washed with pure water, and then oven-dried at 80° C. Filter papers were placed at the bottom and top of sand zones to avoid particles draining into effluent.

Initially, a neutral solution (pH 7) of 10 µM BPA was used to condition the column until effluent BPA concentration matched influent to reach adsorption equilibrium. After BPA breakthrough, another neutral solution containing 10 mM $H_2O_2$, 10 µM BPA, and 5 mM $Na_2SO_4$ electrolyte was pumped up into the vertically aligned column at a rate of 15 mL/min by a peristaltic pump, with a 100 mA electric current applied to the electrodes. A steady-state acid-compartment was formed between electrodes after 60 min, and BPA removal was tested. 1 mL solutions sampled from each port and influent/effluent were neutralized with 1 mL 20 mM phosphate buffer (pH 7) to avoid following analysis inaccuracy due to pH inconsistence. Samples after filtration with 0.45 µm PVDF membrane (13 mm diameter, Jin Teng Ltd., China) were measured by high-performance liquid chromatography (HPLC, Agilent 1200 Infinity Series) equipped with an Agilent Eclipse AAA C18 column (4.6×150 mm). BPA was separated by 0.5 mL/min methanol/water 60/40 mobile phase, and detected at 228 nm wavelength using Agilent 1260 diode array detector. Degradation of other substrates was also tested, and quantification methods were indicated in

TABLE 2

| Substrate | Detection Method | Mobile Phase | Ratio | Flow Rate (mL/min) | Detection Wavelength |
|---|---|---|---|---|---|
| Ibuprofen | HPLC | methanol/water | 68/32 | 0.5 | 228 nm |
| Atrazine | HPLC | methanol/water | 60/40 | 0.5 | 228 nm |
| Carbamazepine | HPLC | methanol/water | 60/40 | 0.5 | 285 nm |
| 4-Chlorophenol | HPLC | acetonitrile/water | 30/70 | 0.5 | 225 nm |
| 4-Nitrophenol | HPLC | acetonitrile/water | 60/40 | 0.5 | 280 nm |
| Rhodamine B | UV-Vis Spectrometer | — | — | — | 554 nm |
| Reactive Blue 19 | UV-Vis Spectrometer | — | — | — | 592 nm |
| Orange II | UV-Vis Spectrometer | — | — | — | 485 nm |

In certain assays, the solution pH, flow rate, and synthetic alkalinity (i.e., 1 mM $Na_2CO_3$ is equivalent to 100 mg $CaCO_3$/L water alkalinity) were subjected to changes as indicated, while other parameters were fixed as stated above. For electricity responsiveness test, experiment was initiated by turning on the 100 mA electric current after conditioning the column, without reaching steady state. For BPA removal in field water bodies, water samples 1 and 2 were taken from lakes in Boston, Mass., US, and water samples 3 and 4 were taken from underground sources of Superfund sites in Puerto Rico. They were stored at 4° C. cold room. Characterizations of the field water samples were shown in Table 3. Water samples were filtrated through 0.45 µm PVDF membranes (47 mm diameter, EMD Millipore, Germany) before use to remove suspended particles. Solution pH was not adjusted after addition of $H_2O_2$ and BPA, and solution intrinsic conductivity supported electrochemical water splitting. BPA concentrations in the influent and effluent were analyzed during steady state.

TABLE 3

| Water Sample | Water type | Total organic carbon (mg/L) | Dissolved oxygen |
|---|---|---|---|
| Sample 1 | Lake water | 21.4 | 8.38 |
| Sample 2 | Lake water | 115.5 | 7.49 |
| Sample 3 | Underground water | 87.2 | 7.92 |
| Sample 4 | Underground water | 158.7 | 7.21 |

Hydroxyl Radical Quantification Method

The total HO. radical amount was quantified via a reported benzoic acid oxidation method[48]. Briefly, the accumulated HO. radical amount equals that of generated p-hydroxybenzoic acid, a product of HO. radical and benzoic acid reaction, multiplied by a conversion factor of 5.87. In batch reaction, 100 mL solutions of 5 mM benzoic acid, 10 mM $H_2O_2$, and 0.2 g/L catalyst (i.e., free FeOCl or immobilized $FeOCl/Al_2O_3$) were stirred for 30 min under indicated solution pH. In flow-through reaction, after conditioning the column with 5 mM benzoic acid until breakthrough, influent solutions containing 5 mM benzoic acid, 10 mM $H_2O_2$, and 5 mM $Na_2SO_4$ at neutral pH passed through the column at a rate of 15 mL/min, with or without 100 mA electric current applied to the electrodes. Effluent samples were collected during steady state. The concentration of generated p-hydroxybenzoic acid was analyzed by HPLC with mobile phase of 0.5 mL/min methanol/water 20/80 and detection wavelength at 255 nm using the same column for BPA analysis.

Density Functional Theory (DFT) Calculation Method

Geometry optimization. DFT calculations were performed with PBE (Perdew-Burke-Ernzerhof) functional by using CASTEP (Clark et al. 2005; Segall et al. 2002) as incorporated in Materials studio 7.0. The ultrasoft pseudo-potential (USPP) was used to represent the core-valence electron interaction. The plane wave expansion basis sets with a cut-off energy of 300 eV was used. The k-point sampling of 4×4×2 within the Monkhorst-Pack special k-point scheme in the Brillouin Zone was considered for the geometry optimization and energy calculation.

Transition state calculation. To investigate the pathways of Fenton process, linear synchronous transit/quadratic synchronous transit (LST/QST) by using DFT+U technique were performed, and the Uvalues of O 2p and Fe 3d is 6.3 and 3.0 eV, respectively. FeOCl (100) surface was considered as reactive surface with two fixed atomic layers (Lahay et al. 2007), and 2×2×1 k-point mesh was used. Spin polarization was considered for all the calculations.

Reactive Transport Model to Estimate the Steady-State pH in the Ella Process

Water splitting is considered as the dominant electrolysis reaction in this system. This process will produce an acid front after the anode and gets neutralized after passing through the cathode.

$$\text{Anode: } 2H_2O \rightarrow O_2 + 4H^+ + 2e^- \tag{1}$$

$$\text{Cathode: } 2H_2O + 2e^- \rightarrow H_2 + 2OH^- \tag{2}$$

Competing reactions may exist depending on the electrolyte composition and concentration, which reduces the current efficiency of the system. However, in this study we assume 100% efficiency for water electrolysis on both electrode surfaces.

Transport process in the column is expressed by Nernst-Plank's equation in dilute electrolytes.

$$J_i = uC_i - D_{H_i}\nabla C_i - u_i z_i F C_i \nabla \phi \tag{3}$$

Where u is the pore water velocity and $J_i$, $C_i$, $D_{H_i}$, $u_i$, and $z_i$ are the total flux, concentration, hydrodynamic dispersion coefficient, mobility, and the charge of $i^{th}$ species, respectively. Species mobility, $u_i$, can be estimated by Einstein relation.

$$u_i = \frac{z_i F D_i}{RT} \tag{4}$$

Hydrodynamic dispersion, $D_H$, is a function of the pore water velocity and is represented as $D_H = \tau D_0 + \alpha_L u$, where the tortuosity, $\tau$, is a measure of effective transport path through media, $D_0$, is the molecular diffusion coefficient, and $\alpha_L$, is the longitudinal dispersivity. Many studies are conducted to evaluate the hydrodynamic dispersion coefficient (De Smedt et al. 1984). This factor in large scale systems is estimated by column tracer test or fitted models of similar experiment characteristics.

In systems with supporting electrolyte, migration term can be neglected. Therefore, the governing equation for a transient simulation is obtained by conservation of mass.

$$\frac{\partial C_i}{\partial t} = -\nabla J_i + R_i \tag{5}$$

Where $R_i$ is the reaction rate of species i in the bulk fluid. Electric field in the electrolyte can be calculated considering conservation of charge in the electrolyte, knowing that current arises from the motion of all charged species.

$$i = -\kappa \nabla \phi - \kappa F \Sigma z_i D_i \nabla C_i \tag{6}$$

Where the first term is ohmic potential and the second term is concentration-caused potential. In systems with supporting electrolyte, the concentration gradient can be neglected and the equation reduces to $$i = -\kappa \nabla \phi \tag{7}$$

where $$\kappa = F^2 \Sigma z_i^2 u_i C_i \tag{8}$$

The inlet boundary condition is considered Dirichlet boundary with a constant feed concentration over time.

$$C(x=0,t) = C_0 \tag{9}$$

The outlet boundary condition is a Neumann boundary condition:

$$\nabla C_i = 0 \tag{10}$$

Fluxes on the surface of the electrodes are shown as followed.

$$J_i|_{x=electrode+\partial x} = J_i|_{x=electrode-\partial x} + J_{eRXN,i} \tag{11}$$

where, $J_{eRXN,i}$, is the inward electrochemical source/sink flux for $i^{th}$ species and is calculated in a constant current operating condition using Faraday's law.

$$J_{eRXN,i} = \frac{I}{z_i F A} \tag{12}$$

I applied current
$z_i$ number of electrons participating for each mole of species i produced/consumed
F Faraday's constant, 96485 c/eq
A Electrode surface area The homogeneous phase reactions included in the model are assumed to reach equilibrium.

$$\Sigma_{j=1}^{N_c} v_{ij} C_j = 0 \text{ for } i=1, \ldots, N_x \tag{13}$$

$N_c$ total number of species
$N_x$ total number of reactions
$v_{ij}$ stochiometric constant for $j^{th}$ species in the $i^{th}$ reaction There have been many studies on integration of species transport and equilibrium reaction models (Acar et al. 1993; Davis et al. 2003; Hojabri et al. 2018; Paz-Garcia et al. 2016; Steefel et al. 1994). In this study, reaction simulations and species concentrations are determined by PHREEQC computer program (Parkhurst et al. 2013). PHREEQC is a computer program which is designed and optimized for aqueous geochemical reactions with a strong database. Nardi et al. have developed a comprehensive geochemical model using COMSOL Multiphysics for transport calculations and PHREEQC for geochemical reaction calculations (Nardi et al. 2014). Paz Garcia et al. have obtained a similar approach in simulation of electrochemical remediation reactors using COMSOL Multiphysics with an interface with PHREEQC. In our study, we used MATLAB as the main platform for numerical calculation with an interface with PHREEQC for chemical reaction calculations. The interface written in MATLAB is used to transfer data between MATLAB and PHREEQC using Microsoft COM (Component Object Model). Phreeqc.dat is the thermodynamic database used in this study for equilibrium calculations. The reactions in the bulk fluid include acid/base reactions, water association/dissociation reaction, and redox reactions. Due to the characteristics of the aqueous reactions in this system, local equilibrium is considered.

In this study, hybrid Finite Volume differencing scheme is used for spatial discretization and implicit scheme is used for temporal discretization with a non-iterative sequential solver for integration of reactions in the simulation. This scheme guarantees continuity of the concerned variables and stability of numerical simulation. The hybrid scheme will evaluate the differencing scheme based on local Peclet number.

$$Pe = \frac{u}{D/L} \tag{14}$$

If the local Peclet number is small, diffusion is dominant and central differencing scheme results in smaller error. However, if the advection is dominant, upwind scheme is used to more accurately capture the impact of advection (Versteeg et al. 2007).

Example 1. Design of a Flow-Through Water Treatment Platform

Ella process was utilized to regulate pH of heterogeneous Fenton-like catalysts for water treatment with desired acidity. To this end, immobilized catalysts must be transferred to the acidic zone mediated by the Ella process, whereby $H_2O_2$ is rapidly transformed into oxidizing HO. radicals, leading to the instant degradation of organic compounds in the local vicinity (FIG. 1A). This coupled water treatment process is categorized as electro-Fenton-like (EFL) platform in this study. The flow-through treatment method is especially favored over batch reaction mode for industry application, since a water treatment plant treats high volume of contaminated water in a fast pace. Besides, it is worth of noting that the EFL platform can take advantage of the intermittent solar and wind electricity, often with near-zero or even negative prices.

The contaminants treatment efficiency by the EFL platform is majorly determined by the reaction during the transport through catalyst column, that is, longer retention time and higher catalyst and $H_2O_2$ concentration tend to result in more complete contaminants removal. Therefore, the key aspects to warrant the success of the EFL platform are to promote HO. generation and allow sufficient reaction time within the column.

pH Regulation by the Ella Process

Figure 1B:
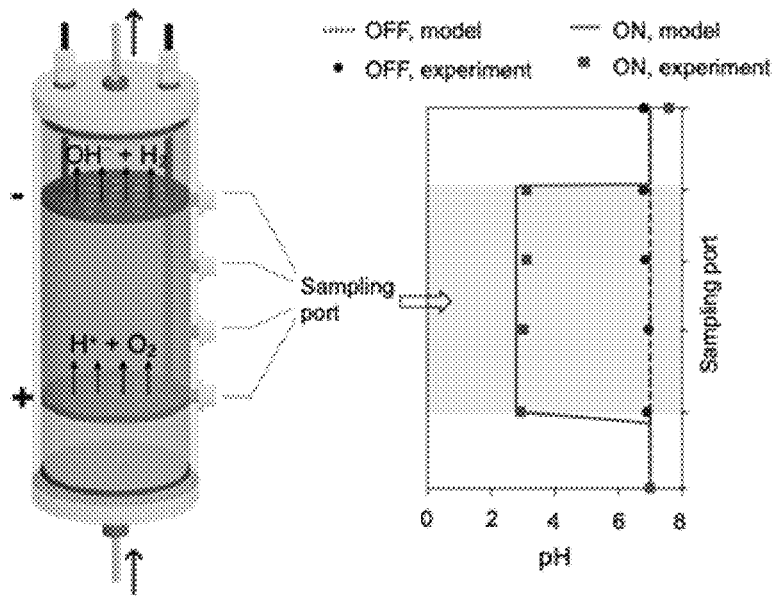
FIG. 1B: Automatic pH regulation by the Ella process. Left panel depicts the setup configuration, and right panel indicates the pH variation profile along the column axis as the applied electric current was turned off and on. Arrows indicate flow direction. "+" and "−" denote anode and cathode, respectively.
Figure 2A:
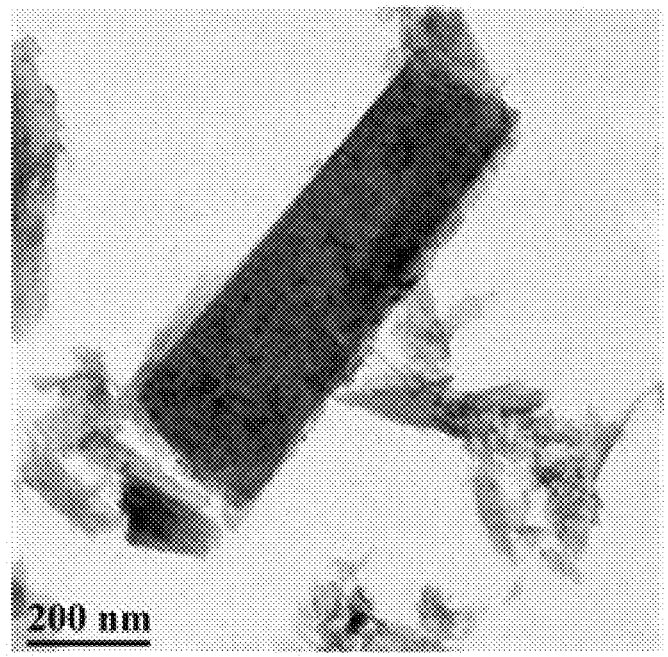
FIG. 2A: Characterizations of synthesized FeOCl nanosheet catalyst: TEM image.
Figure 2B:
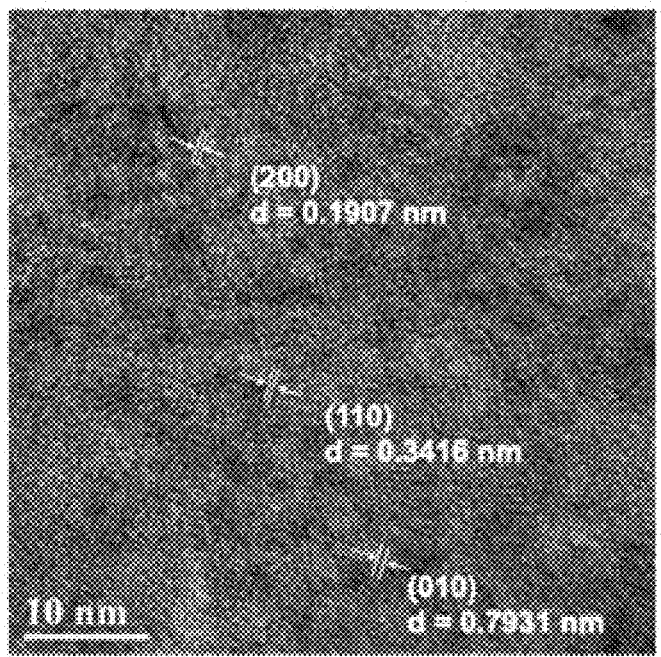
FIG. 2B: Characterizations of synthesized FeOCl nanosheet catalyst: HRTEM image.
Figure 2C:
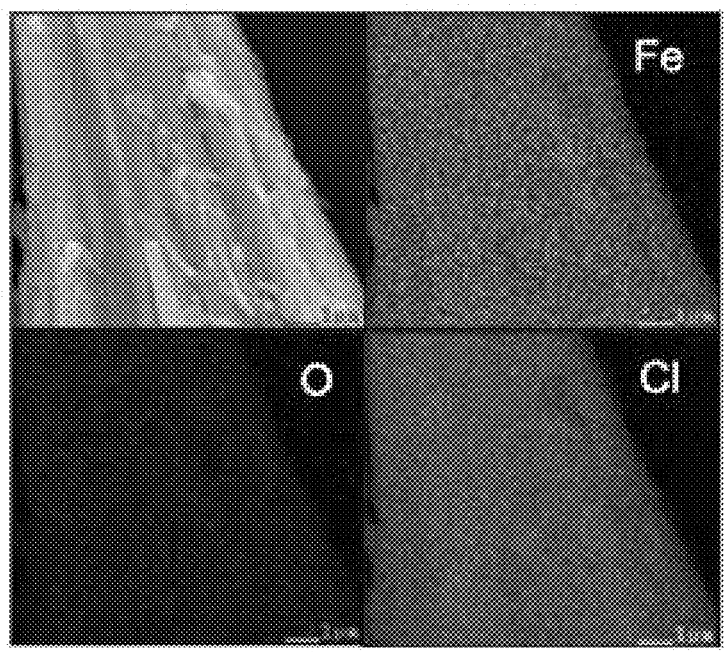
FIG. 2C: Characterizations of synthesized FeOCl nanosheet catalyst: Element mapping images.
Figure 2D:
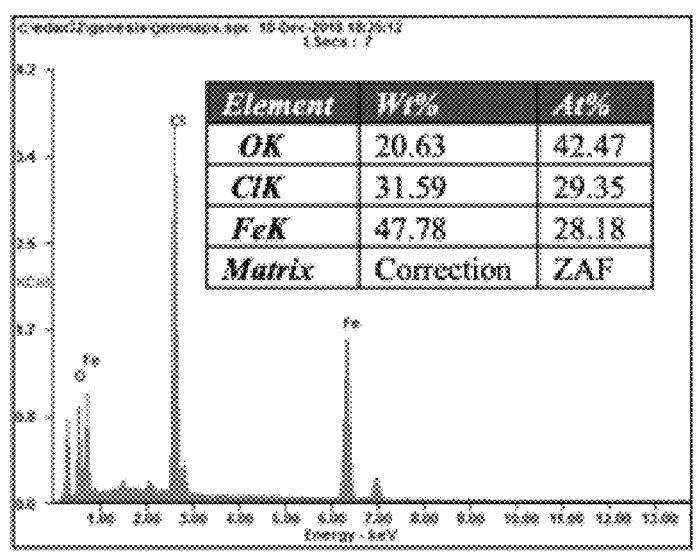
FIG. 2D: Characterizations of synthesized FeOCl nanosheet catalyst: Element ratio measurement from EDX analysis.
Figure 3A:
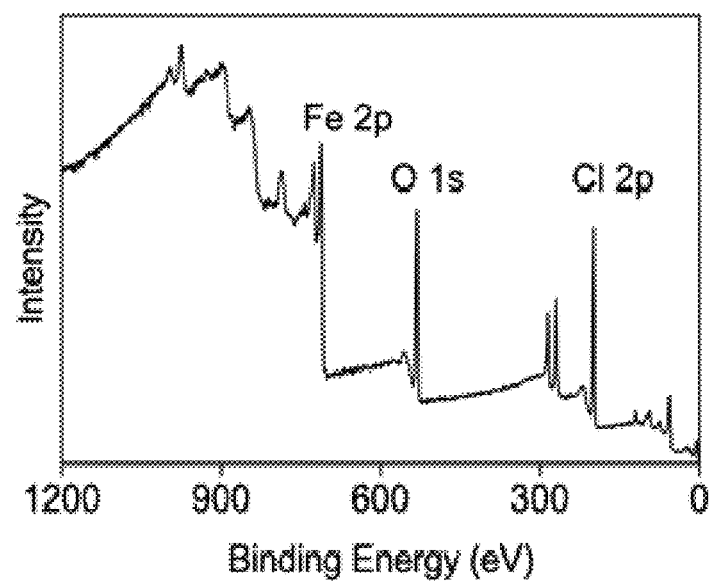
FIG. 3A: XPS characterization of FeOCl sample: Survey spectrum.
Figure 3B:
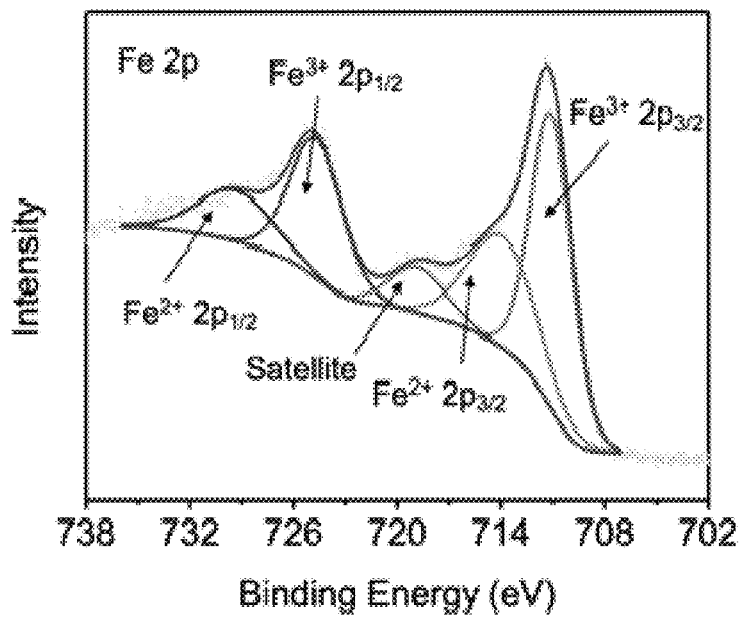
FIG. 3B: XPS characterization of FeOCl sample: Fe 2p.
Figure 3C:
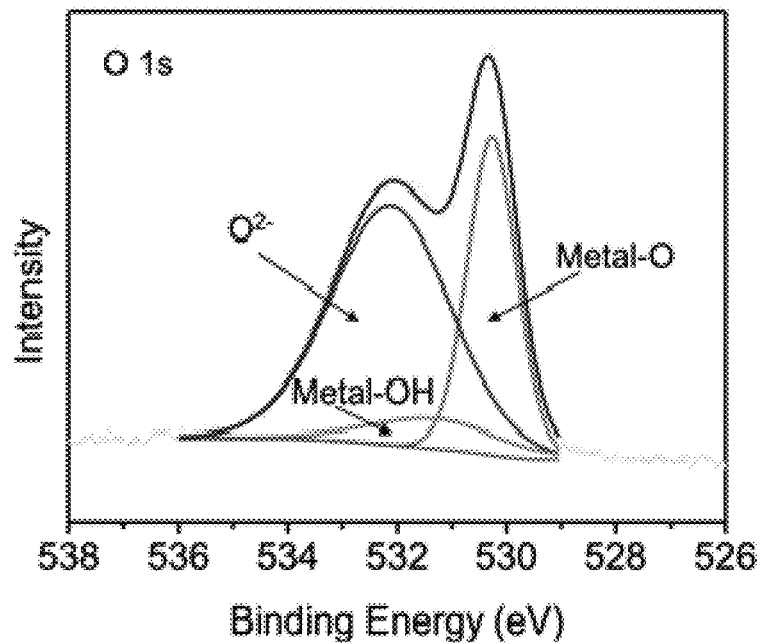
FIG. 3C: XPS characterization of FeOCl sample: O 1s.
Figure 3D:
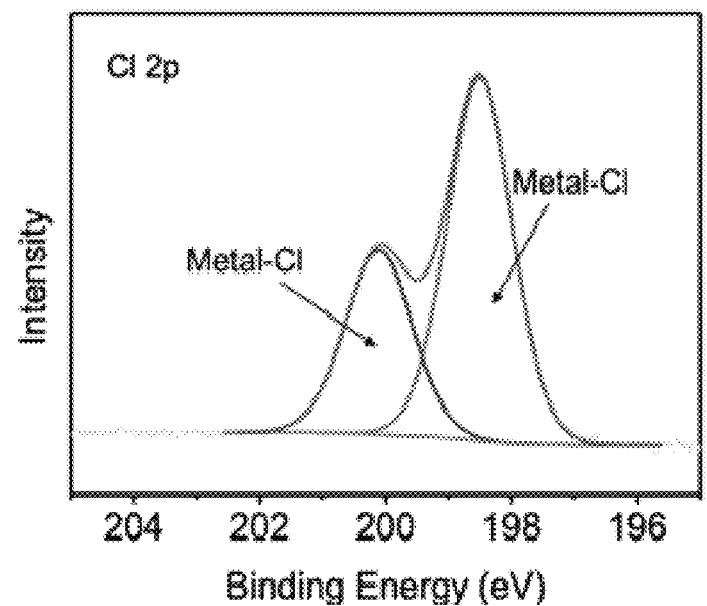
FIG. 3D: XPS characterization of FeOCl sample: Cl 2p.

As a proof of concept, a benchtop flow-through device was manufactured for our EFL platform. A set of stable mixed metal oxide electrodes were installed 9 cm apart in a vertically anchored acrylic flow-through column device (15 cm×5 cm O.D.). The column was filled with clean silica sand (0.15 to 0.6 mm) to maintain a laminar flow. A combination of 100 mA electric current and 15 mL/min hydraulic flow rate was applied to the neutral solution passing through the column, and solution pHs at various locations along the column were measured (FIG. 1B). The solution was homogeneously neutral without electric current; however, by turning on the 100 mA electric current, an acidic pH of 2.93-3.12 between the anode and cathode was automatically attained at steady state. The electrochemically created acidity is suitable for most Fenton-like catalysts. The effluent pH measured as 7.59 was close to the influent value (pH 7), showing minimal effect on the treated water pH. A reactive transport model that accounts for advection, hydrodynamic dispersion, and ion migration was used to simulate the pH profile (Hojabri et al. 2018). Modeling results indicate that the theoretical acidity of the confined space between electrodes using the above stated experimental settings is pH 2.8. The slight discrepancy of pH between experimental results and modelled value is possibly because the current efficiency of water electrolysis was not 100% due to possible energy losses in a non-ideal system.

Immobilization of Fenton-Like Catalyst

Figure 4A:
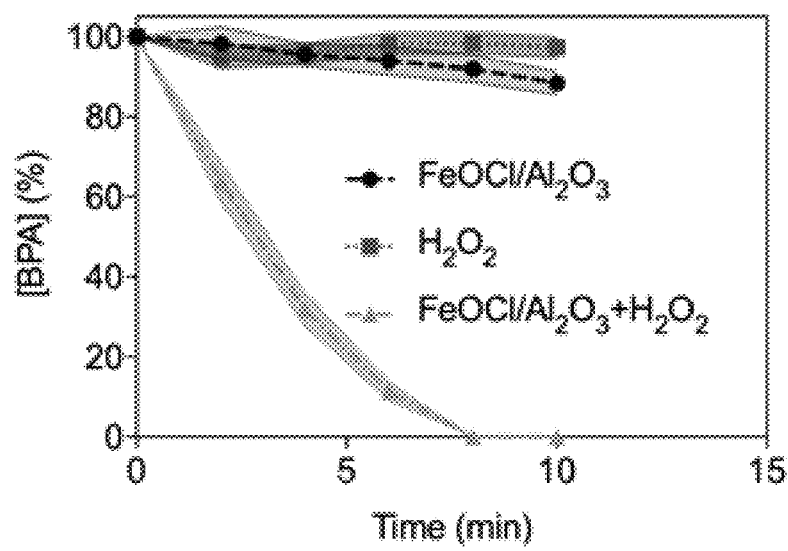
FIG. 4A: Activity of synthesized FeOCl:BPA degradation by FeOCl/$H_2O_2$ reaction.
Figure 4B:
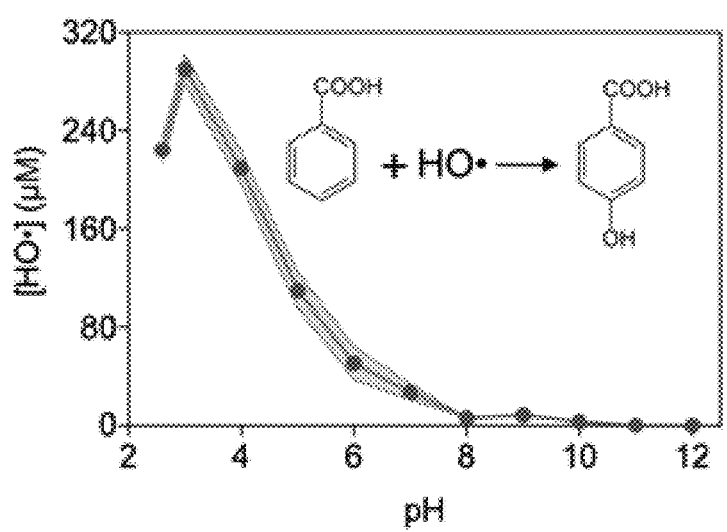
FIG. 4B: Activity of synthesized FeOCl: Quantification of generated HO. radical by FeOCl/$H_2O_2$ reaction at different pH.
Figure 10A:
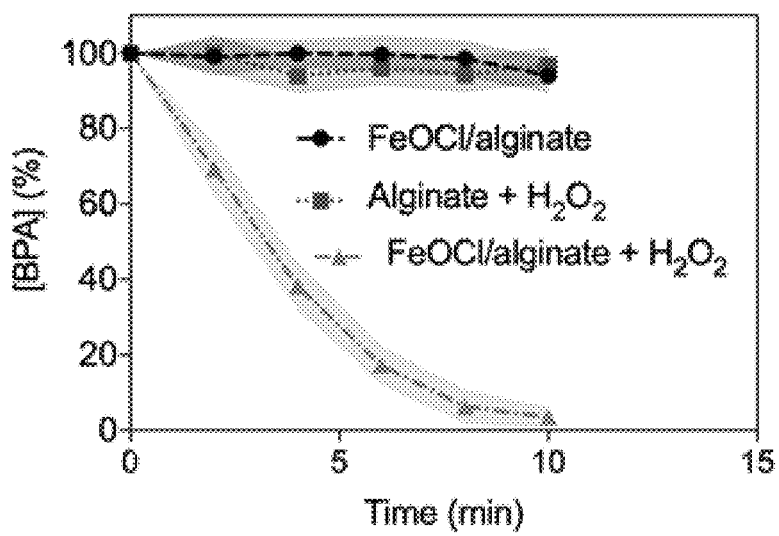
FIG. 10A: Activity of synthesized FeOCl: BPA degradation by FeOCl/$H_2O_2$ reaction.

Iron oxychloride (FeOCl) was reported to possess extraordinary Fenton-like activity with high fidelity and can be mass produced (Sun et al. 2018; Yang et al. 2013). Characterizations of the synthetic FeOCl nanocatalyst produced via the calcination of $FeCl_3 \cdot 6H_2O$ were shown in FIGS. 2 and 3. Bisphenol A (BPA) was used as the primary pollutant to illustrate FeOCl catalytic degradation performance, provided BPA is an environmental estrogen that disrupts human endocrine system upon exposure (Vanderberg et al. 2007). 10 µM BPA was rapidly degraded by the $FeOCl/H_2O_2$ reaction. On the contrary, the addition of ethanol, a strong HO. radical quencher (Adams et al. 1965), competed with BPA for the produced HO. radical reservoir and fully inhibited BPA removal by $FeOCl/H_2O_2$ reaction, demonstrating the degradation of BPA was via HO. radical (FIG. 10). The activity of synthesized FeOCl sample was tested by decomposing $H_2O_2$ for BPA removal. It was shown that 0.2 g/L FeOCl with 10 mM $H_2O_2$ at pH 3 could remove 86% 10 µM BPA in 6 min and 100% BPA in 8 min. The role of HO. radical in BPA removal was verified by ethanol as a scavenger, since it fully inhibited BPA removal via quenching HO. radical. The catalytic activities of FeOCl at different pHs were compared. Results showed that, the optimum pH for FeOCl is around pH 3 as it mediated the highest yield of HO. radical. It was further found that FeOCl showed optimal activity at pH 3, around 9.3-fold higher than that at pH 7 in terms of HO. radical yield (FIG. 4B).

Figure 5:
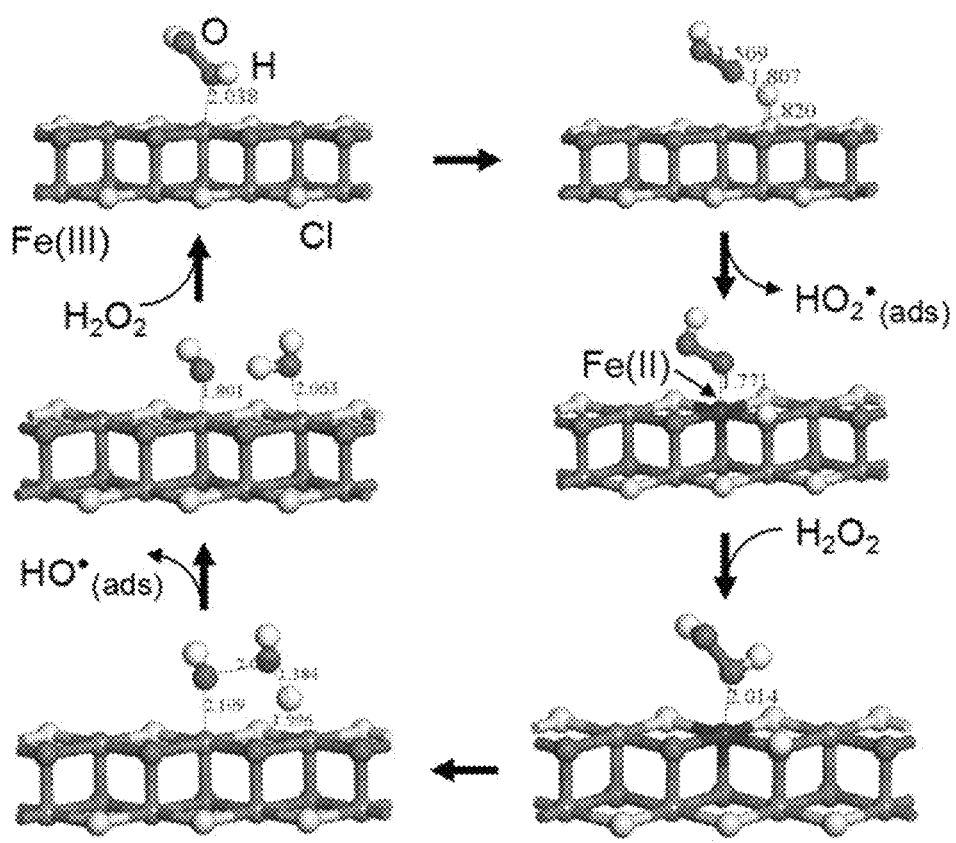
FIG. 5: Peroxidase-like catalysis mechanism of FeOCl/$H_2O_2$ reaction.
Figure 6:
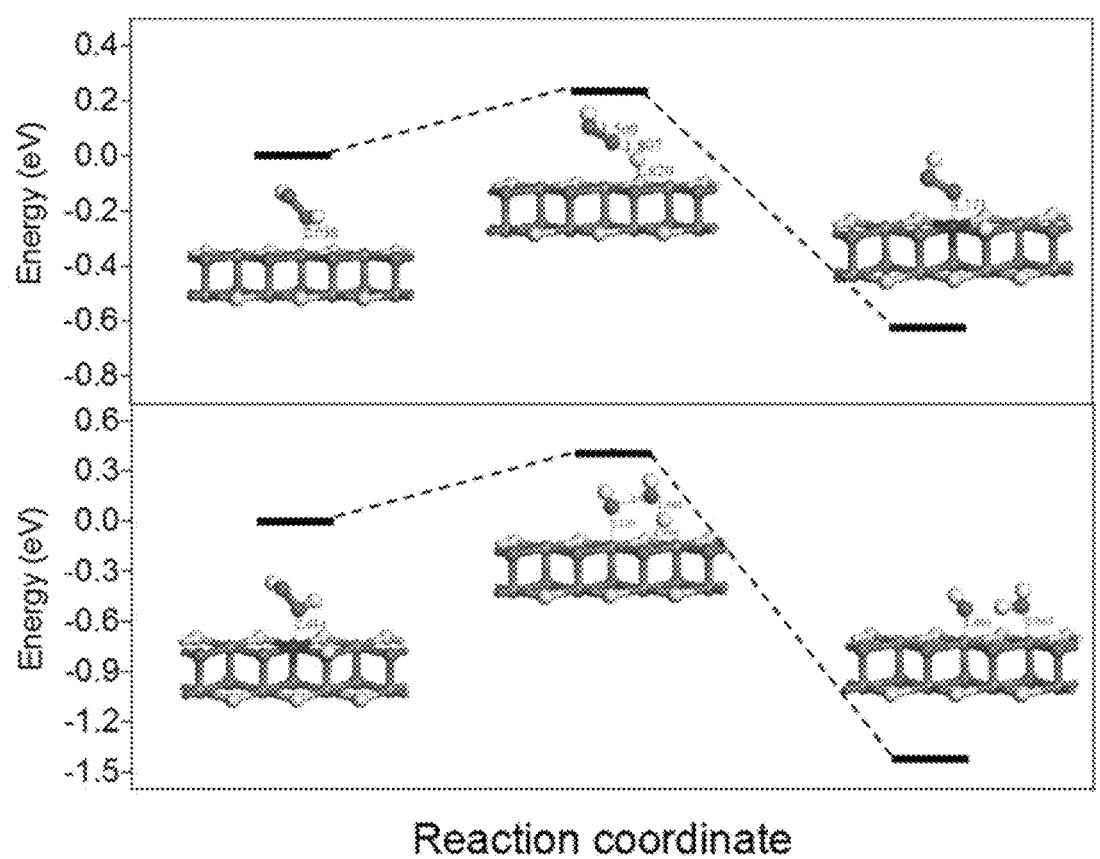
FIG. 6: Reaction energy in step 1 (top) and step 2 (bottom) based on DFT calculation. Step 1: $Fe^{III}OCl$ is at first reduced by $H_2O_2$ into $Fe^{II}OCl$, and Step 2: the derived $Fe^{II}OCl$ then decomposes $H_2O_2$ into HO. radical via homolytic cleavage.

Density functional theory (DFT) calculation was harnessed to study the catalysis mechanism of the $FeOCl/H_2O_2$ reaction. It was revealed that the reaction is accomplished via two electron-transfer processes (FIG. 5). In the first step, $Fe^{III}OCl$ is at first reduced by $H_2O_2$ into $Fe^{II}OCl$, and the second step the derived $Fe^{II}OCl$ then decomposes $H_2O_2$ into HO. radical via homolytic cleavage. The readily reducible nature of unsaturated Fe atoms on the exposed (100) surface of FeOCl crystals allows rapid turnovers of $Fe^{III/II}$ to catalyze the $H_2O_2$ transformation. Specifically, the energy barrier of reducing $Fe^{III}$ to $Fe^{II}$ on FeOCl crystals by $H_2O_2$ was determined to be 0.235 eV (FIG. 6), whereas that of hematite ($Fe_2O_3$, a rhombohedral Fenton-like catalyst) is 0.76 eV as a comparison (Ji et al. 2019).

Figure 7A:
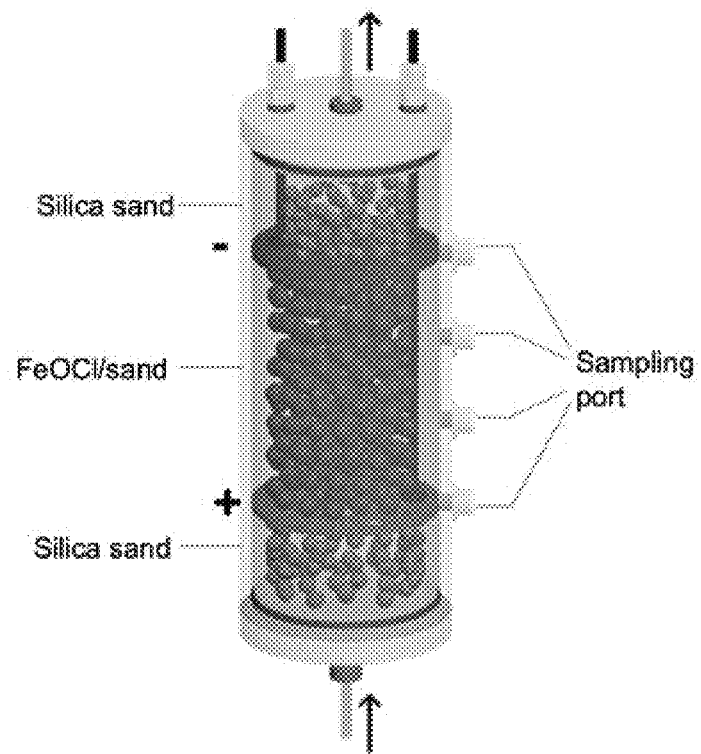
FIG. 7A: BPA removal by EFL platform loading unimmobilized FeOCl: Illustration of reactor components.
Figure 7B:
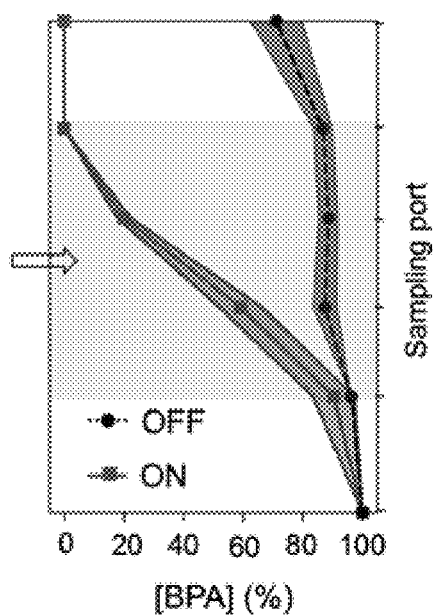
FIG. 7B: BPA removal by EFL platform loading unimmobilized FeOCl: BPA removals from each sampling port as the electric current was turned on and off.
Figure 8:
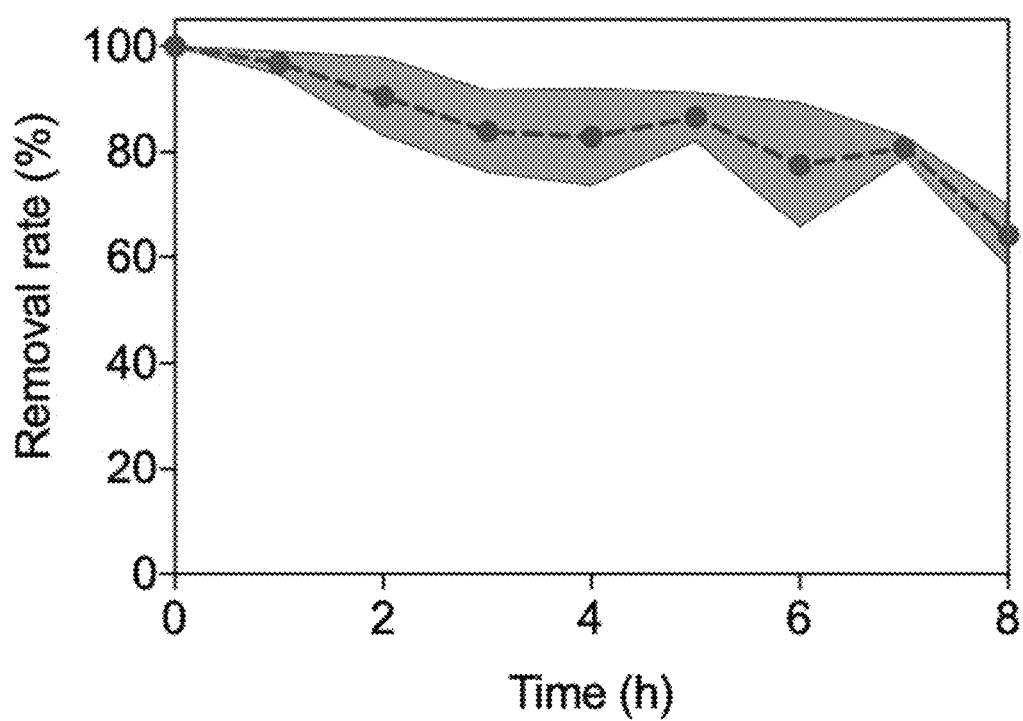
FIG. 8: Stability test of BPA removal by reactor loading unimmobilized FeOCl (shown in FIG. 7A) for 8 h.
Figure 9A:
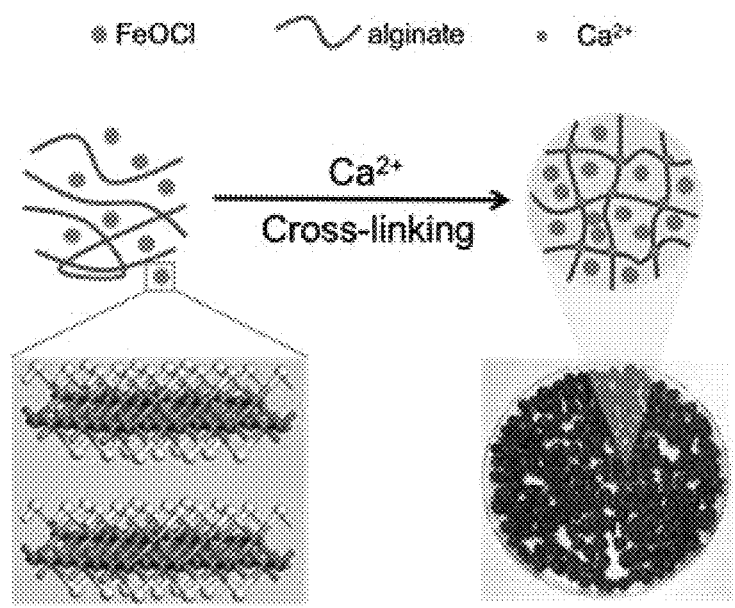
FIG. 9A: Immobilization of FeOCl on alginate hydrogel: Illustration of immobilization strategy.
Figure 9B:
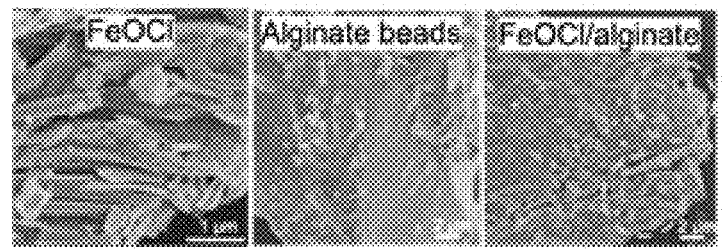
FIG. 9B: Immobilization of FeOCl on alginate hydrogel: SEM images.
Figure 9C:
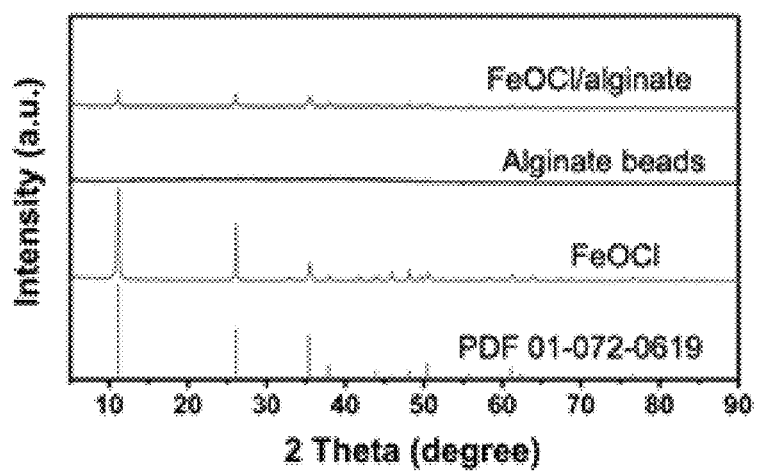
FIG. 9C: Immobilization of FeOCl on alginate hydrogel: XRD characterizations.
Figure 10B:
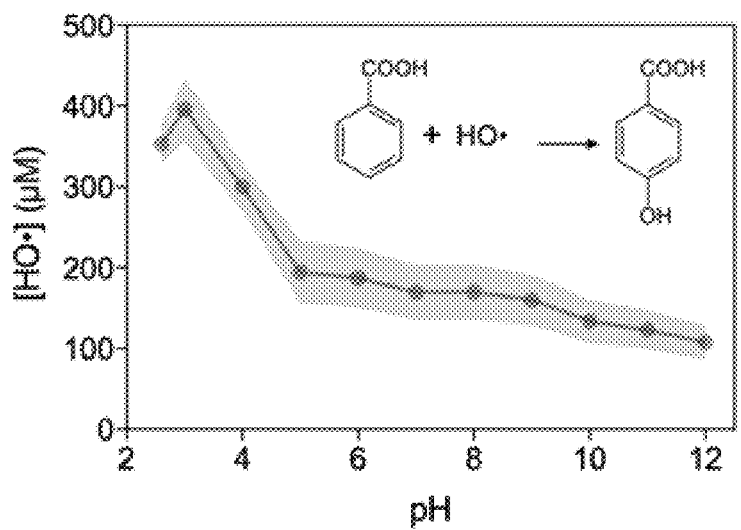
FIG. 10B: Activity of synthesized FeOCl: Quantification of generated HO. radical by FeOCl/$H_2O_2$ reaction at different pH.
Figure 11A:
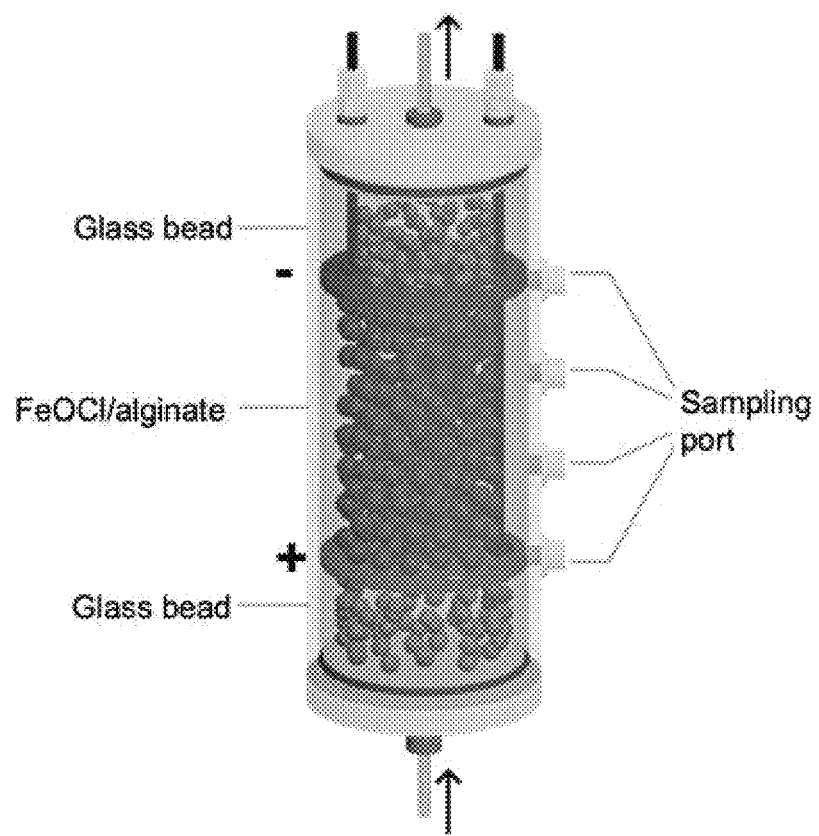
FIG. 11A: BPA removal by EFL platform loading FeOCl/alginate catalyst composite: Illustration of reactor components. The 4.5 g (dry weight) as-prepared FeOCl/alginate was filled in between the cathode and anode, and all other spaces were filled with glass beads to reduce hydrodynamic perturbation. The pore volume of our reactor between cathode and anode was 60 mL. Typically, a neutral solution containing 10 mM $H_2O_2$, 10 μM BPA, and 5 mM $Na_2SO_4$ as electrolyte was pumped up into the vertically aligned reactor at a rate of 3 mL/min. A steady-state acidic-compartment was formed between the cathode and anode under a current of 40 mA after 60 min, and FeOCl/alginate catalyzed $H_2O_2$ decomposition for BPA removals was tested.
Figure 11B:
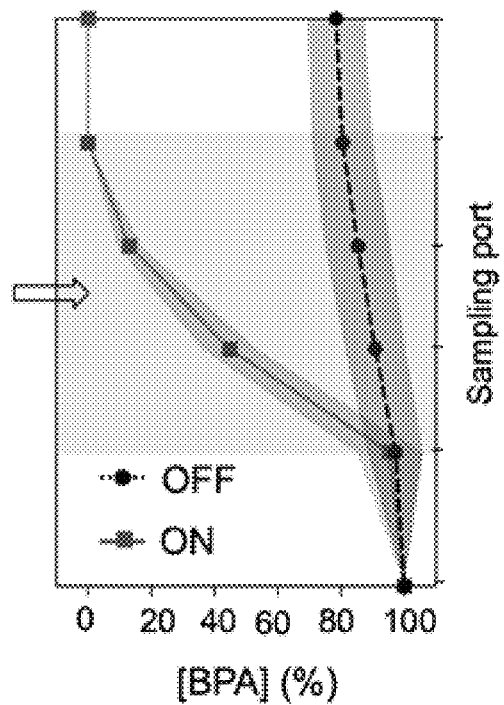
FIG. 11B: BPA removal by EFL platform loading FeOCl/alginate catalyst composite: BPA removals from each sampling port as the electric current was turned on and off.
Figure 12:
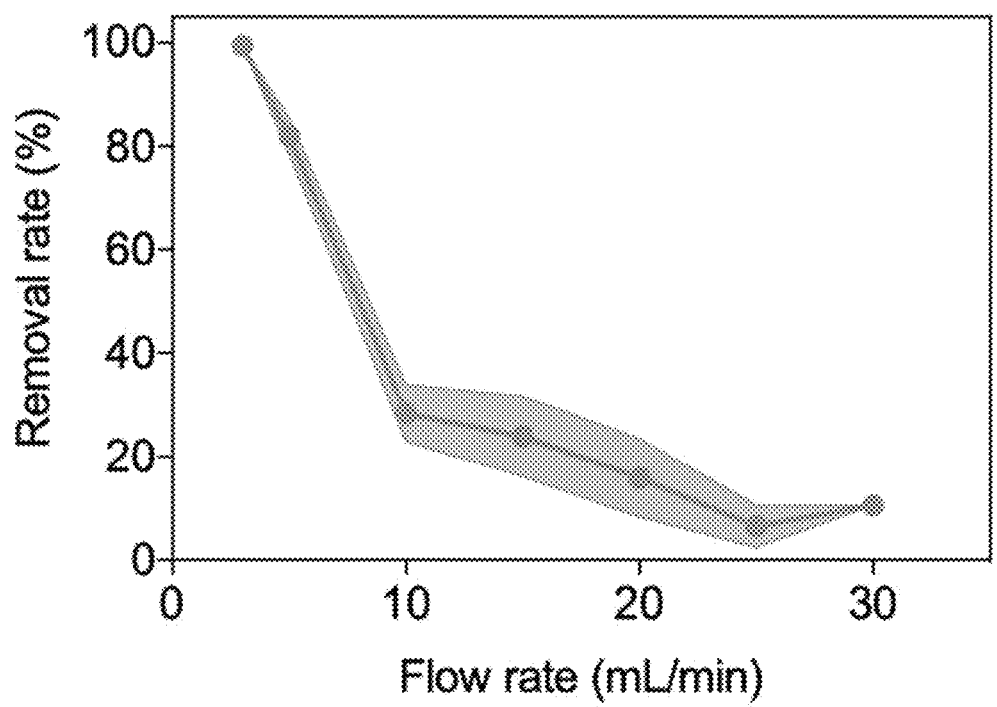
FIG. 12: BPA removal under different flow rate by EFL platform loading FeOCl/alginate catalyst composite (as shown in FIG. 11A).

It is, however, a great concern that the micro catalyst particles are subject to fluid transport, resulting in potential draining from the silica sand pores within the column device. For instance, by packing well-mixed FeOCl and silica sand particles into the column (FIG. 7), the overall catalyst activity decayed by 36% after 8 h due to hydraulic erosion (FIG. 8). Another immobilization strategy of cross-linking FeOCl with alginate hydrogel was attempted for effective retention of FeOCl nanoparticles (FIG. 9) (Smidsrød et al. 2019). However, the resulting FeOCl/alginate composite showed only 1% activity compared to the same amount of unimmobilized FeOCl catalyst (FIG. 10), delivering poor in-reactor performance under high flow rates (FIGS. 11 and 12). At pH 3, 0.2 g/L FeOCl and 10 mM $H_2O_2$ mediated formation of 305.3 µM HO. radical (FIG. 4B) after 30 min, while 0.075 g/mL FeOCl/alginate (dry weight, 1:2 FeOCl:alginate) produced 396.2 µM HO. radical (FIG. 10B). As a result, the specific activity of unimmobilized and immobilized FeOCl was calculated as 1511.5 and 15.8 µM HO./(g $L^{-1}$) FeOCl, respectively. This is due to a large fraction of FeOCl particles becoming buried inside the hydrogel of the FeOCl/alginate composite and were not effectively accessible by $H_2O_2$ molecules.

Figure 13A:
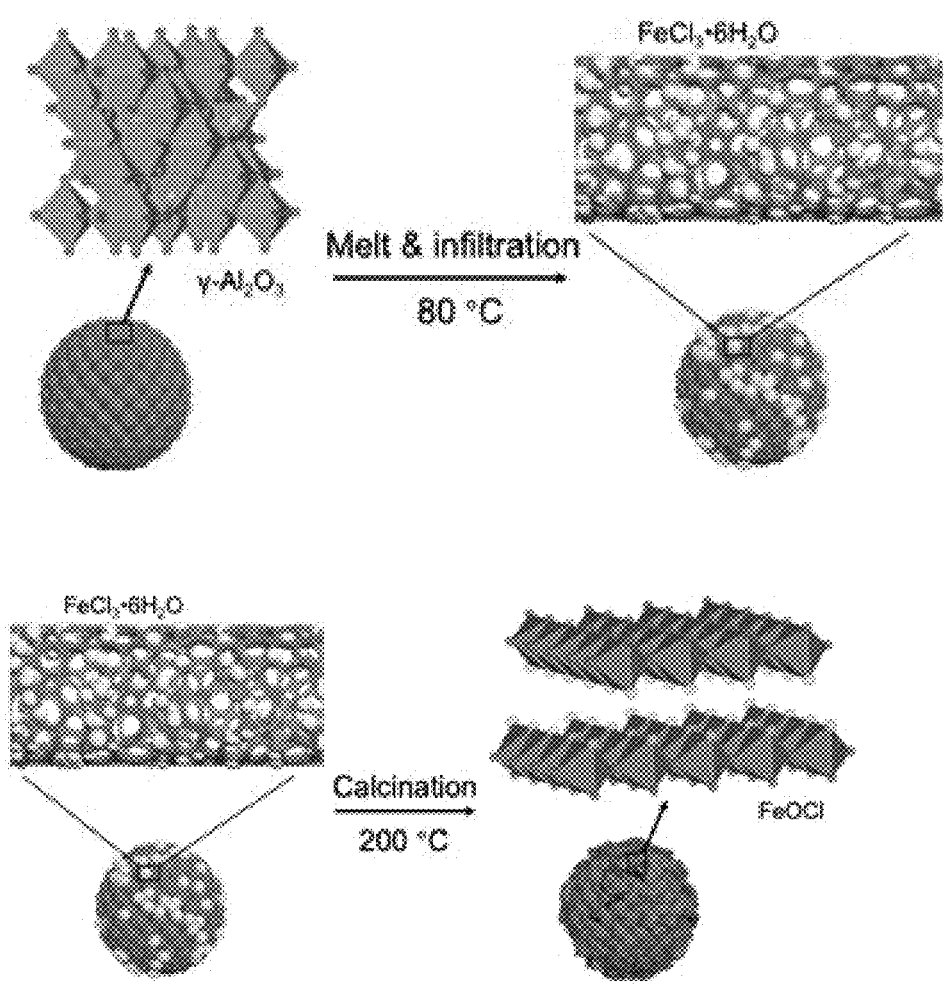
FIG. 13A: Immobilization of FeOCl onto γ-$Al_2O_3$ support. Illustration of melt infiltration strategy.
Figure 13B:
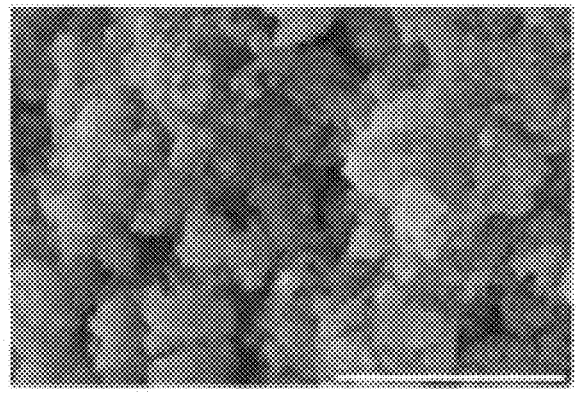
FIG. 13B: SEM image of γ-$Al_2O_3$. Scale bars indicate 1 μm.
Figure 13C:
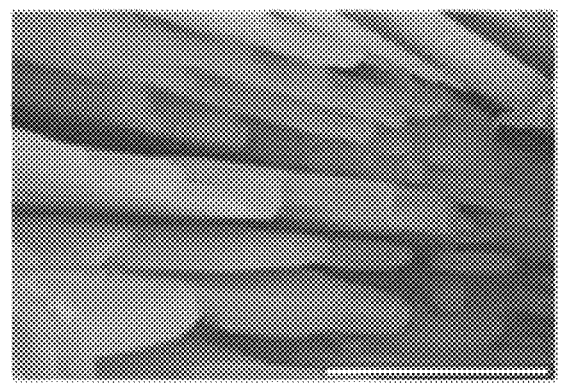
FIG. 13C: SEM image of FeOCl. Scale bars indicate 1 μm.
Figure 13D:
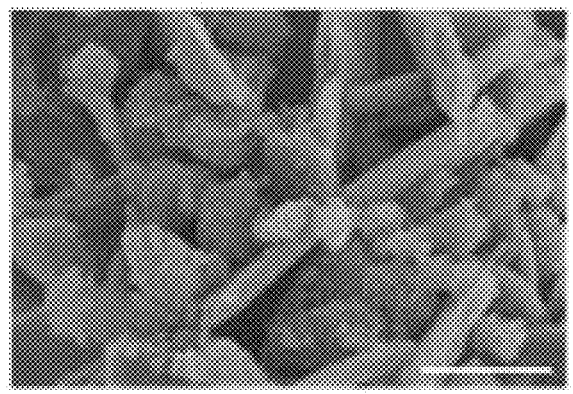
FIG. 13D: SEM image of FeOCl/$Al_2O_3$. Scale bars indicate 1 μm.
Figure 13E:
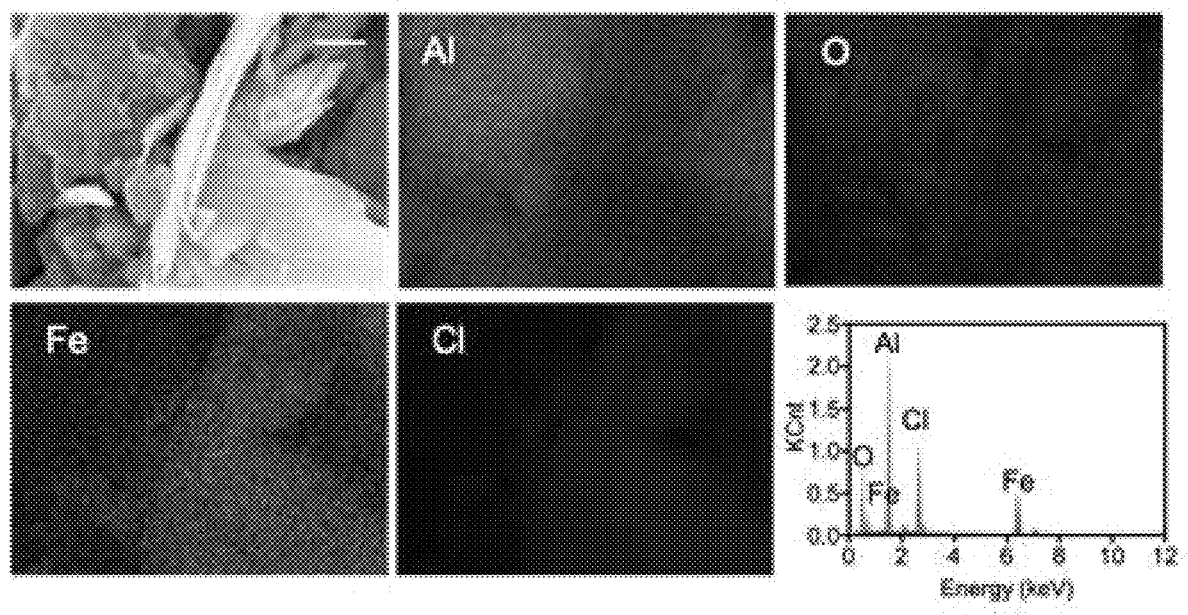
FIG. 13E: EDX element mapping and analysis of FeOCl/$Al_2O_3$. Scale bars indicate 1 μm.
Figure 13F:
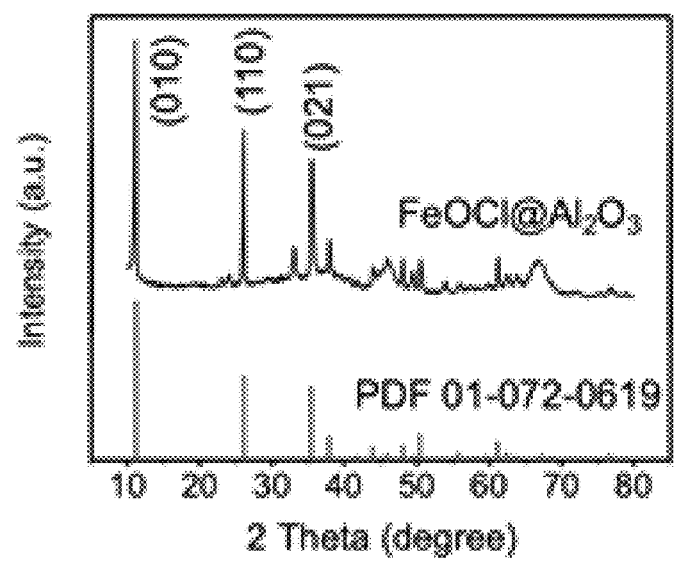
FIG. 13F: XRD pattern of FeOCl/$Al_2O_3$.
Figure 13G:
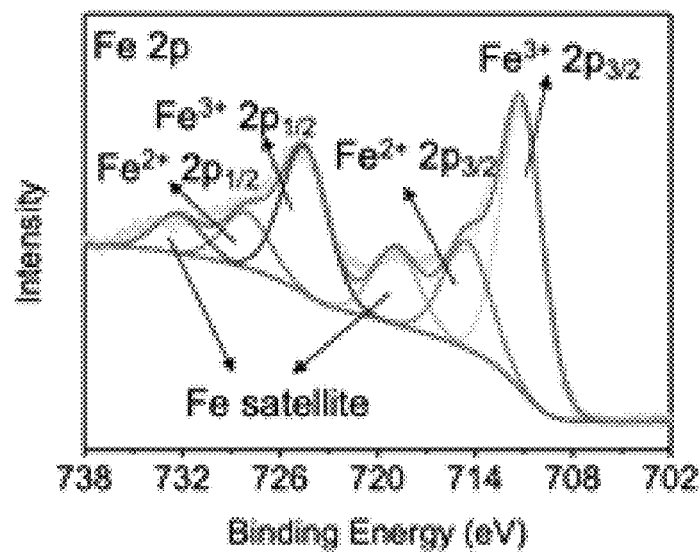
FIG. 13G: Fe 2p deconvolution spectra of XPS analysis. Scale bars indicate 1 μm.
Figure 14A:
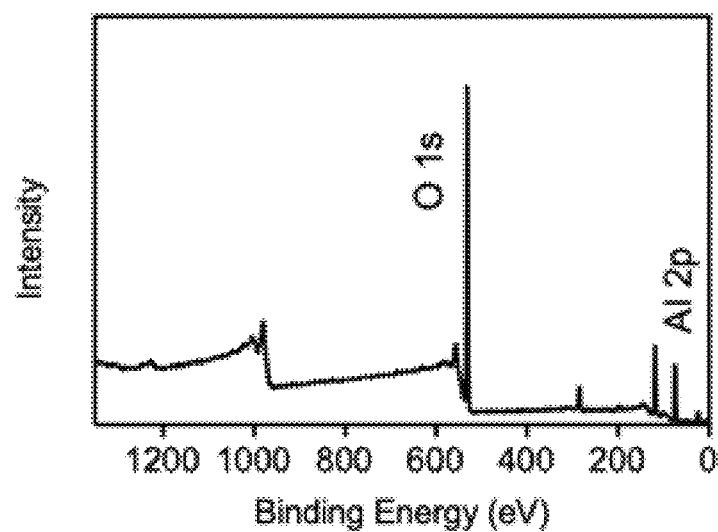
FIG. 14A: XPS characterization of γ-$Al_2O_3$: Survey spectrum. The observed Al—O—H bond was due to chemisorbed moisture on γ-$Al_2O_3$ surface.
Figure 14B:
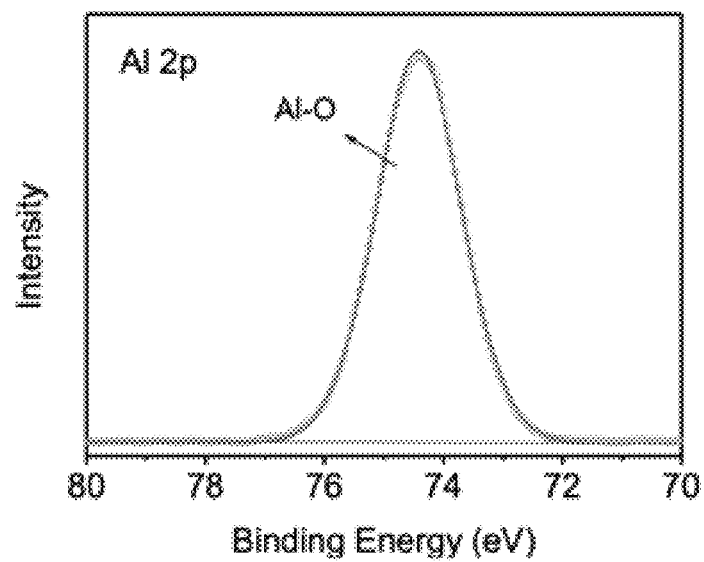
FIG. 14B: XPS characterization of γ-$Al_2O_3$: Al 2p. The observed Al—O—H bond was due to chemisorbed moisture on γ-$Al_2O_3$ surface.
Figure 14C:
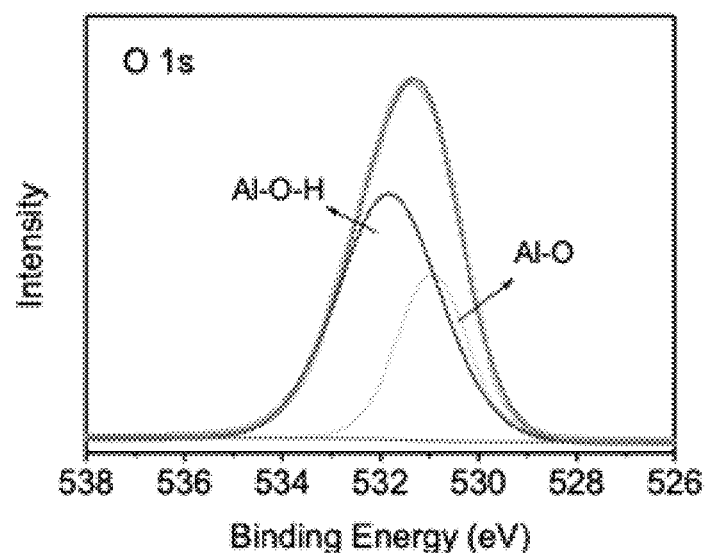
FIG. 14C: XPS characterization of γ-$Al_2O_3$: O 1s. The observed Al—O—H bond was due to chemisorbed moisture on γ-$Al_2O_3$ surface.
Figure 15A:
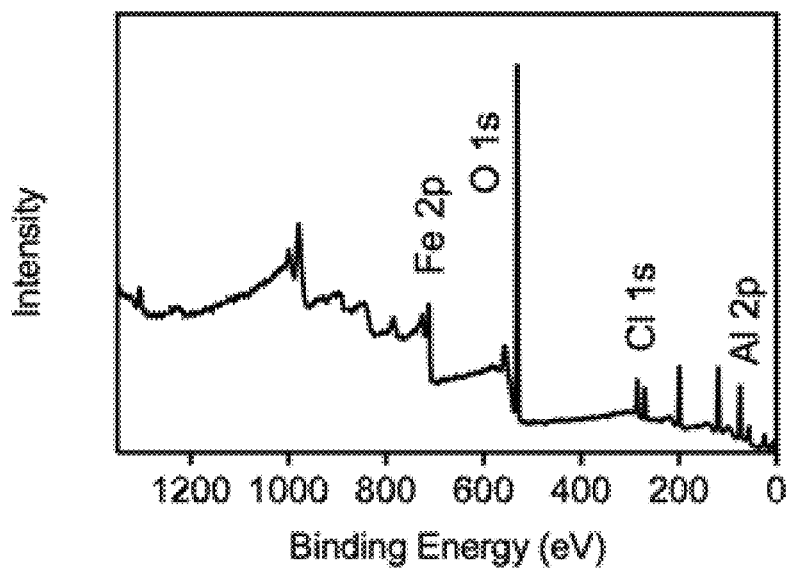
FIG. 15A: XPS characterization of FeOCl/$Al_2O_3$: Survey spectrum. Fe 2p deconvolution spectra are shown in FIG. 13G in the main text.
Figure 15B:
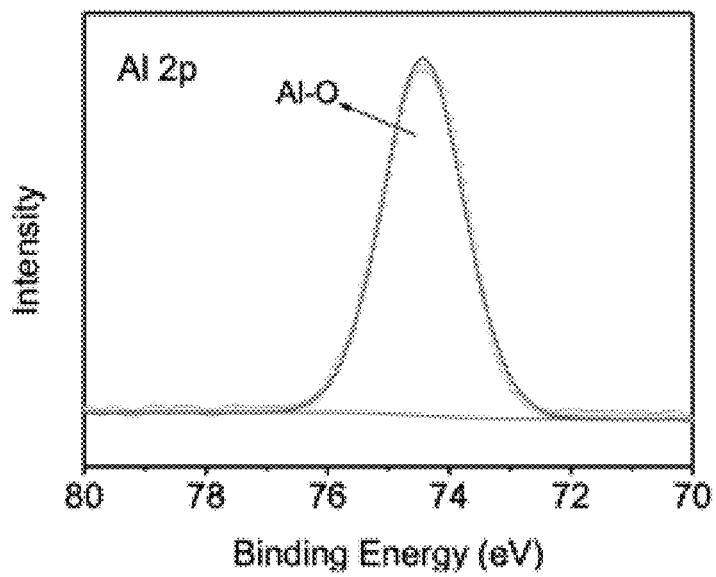
FIG. 15B: XPS characterization of FeOCl/$Al_2O_3$: Al 2p. Fe 2p deconvolution spectra are shown in FIG. 13G in the main text.
Figure 15C:
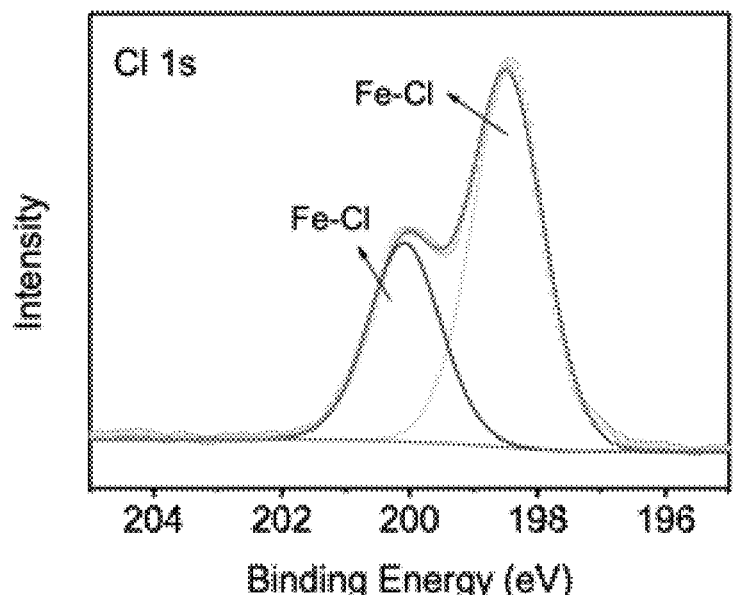
FIG. 15C: XPS characterization of FeOCl/$Al_2O_3$: Cl 1s. Fe 2p deconvolution spectra are shown in FIG. 13G in the main text.
Figure 15D:
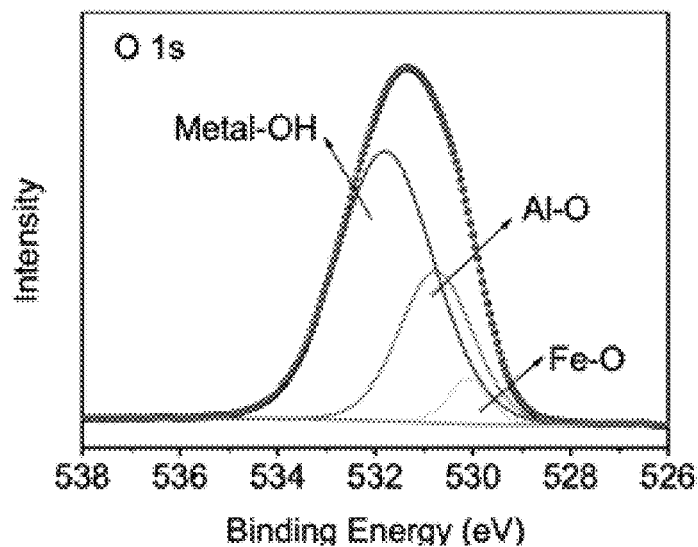
FIG. 15D: XPS characterization of FeOCl/$Al_2O_3$: O 1s. Fe 2p deconvolution spectra are shown in FIG. 13G in the main text.
Figure 18:
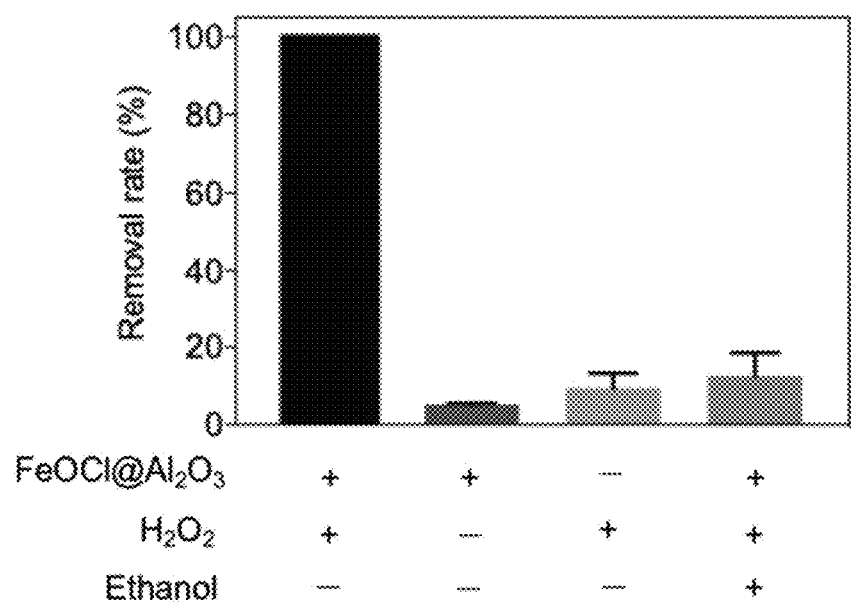
FIG. 18: Control experiments of column reaction. BPA removal by the EFL water treatment platform with 1). Both FeOCl/$Al_2O_3$ and $H_2O_2$, 2). Only FeOCl/$Al_2O_3$, 3). Only $H_2O_2$, and 4). FeOCl/$Al_2O_3$, $H_2O_2$, and ethanol. Reaction conditions: 100 mA electric current, 15 mL/min flow rate, 10 mM $H_2O_2$, 5 mM $Na_2SO_4$ electrolyte, pH 7. When FeOCl/$Al_2O_3$ was not used, silica sand particles were filled into the catalyst zone instead. 10 mM ethanol was used as HO. radical quencher.

To solve this problem, FeOCl nanoparticles were alternatively immobilized on a porous $\gamma$-$Al_2O_3$ support via a melt infiltration method (FIG. 13A) (Eggenhuisen et al. 2010), with the belief that this approach offers maximum FeOCl catalytic sites for $H_2O_2$ molecules. Field emission scanning electron microscopy (FESEM) images clearly revealed the dispersion of FeOCl nanosheets on the amorphous $\gamma$-$Al_2O_3$ support in the synthesized FeOCl/$Al_2O_3$ composite (FIGS. 13B-13D), with a surface area of 206 $m^2$/g (Table 4). The compositional distribution of the FeOCl/$Al_2O_3$ was investigated with energy-dispersive X-ray spectroscopy (EDX) (FIG. 13E). EDX analysis identified Al, O, Fe, and Cl elements on the FeOCl/Al$_2$O$_3$ composite. Elemental mapping results suggested that Al and Fe elements were separately located, in agreement with the overlay structure of the FeOCl/Al$_2$O$_3$ composite. Besides, Cl element exhibited consistent pattern with Fe element on the FeOCl surface, while O element was uniformly distributed on the FeOCl/Al$_2$O$_3$ composite. X-ray diffraction (XRD) of the FeOCl/Al$_2$O$_3$ composite disclosed several characteristic diffraction peaks (2θ) at 11.2, 26.1, and 35.4°, which respectively belongs to the (010), (110), and (O$_{21}$) plane of orthorhombic FeOCl crystal (PDF 01-072-0619) (FIG. 13F). The chemical states of compositional elements were studied with X-ray photoelectron spectroscopy (XPS). In particular, deconvoluted Fe 2p spectrum showed Fe$^{3+}$2p$_{1/2}$ (724.6 eV) and 2p$_{3/2}$ (711.2 eV) were dominant over Fe$^{2+}$2p$_{1/2}$ (728.2 eV) and 2p$_{3/2}$ (714.6 eV) (FIG. 13G), consistent with the unimmobilized FeOCl crystal (FIG. 3). XPS analyses of other elements in the FeOCl/Al$_2$O$_3$ composite and the γ-Al$_2$O$_3$ support are shown in FIGS. 15 and 18. Overall, the above results suggested that the morphology and electronic properties of the FeOCl crystal remained intact after immobilization on the γ-Al$_2$O$_3$ support.

TABLE 4

|  |  | γ-Al$_2$O$_3$ | FeOCl/Al$_2$O$_3$ |
|---|---|---|---|
| Pore Volume | BET Surface Area | 883.9819 m$^2$/g | 212.7531 m$^2$/g |
|  | BJH Adsorption cumulative volume of pores between 1.7 nm and 300 nm width | 1.396243 cm$^3$/g | 0.577339 cm$^3$/g |
|  | BJH Desorption cumulative volume of pores between 1.7 nm and 300 nm width | 1.401154 cm$^3$/g | 0.556347 cm$^3$/g |
| Pore Size | Adsorption average pore diameter (4V/A by BET) | 5.92993 nm | 10.94665 nm |
|  | BJH Adsorption average pore width (4V/A) | 7.8207 nm | 8.7791 nm |
|  | BJH Desorption average pore width (4V/A) | 7.0510 nm | 9.1477 nm |

Figure 16A:
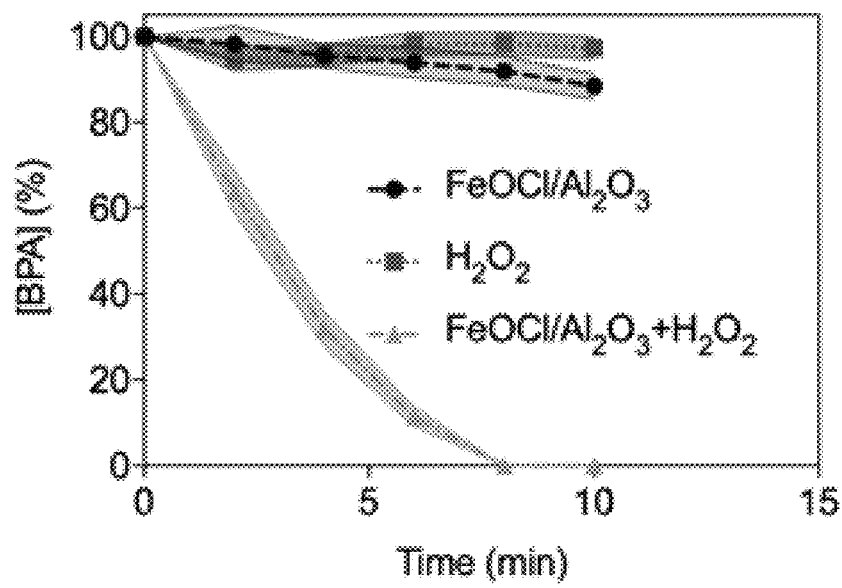
FIG. 16A: Catalytic activity of FeOCl/$Al_2O_3$ composite. BPA degradation by FeOCl/$Al_2O_3$ and $H_2O_2$ reaction and controls. Reactions were performed at pH 3.
Figure 16B:
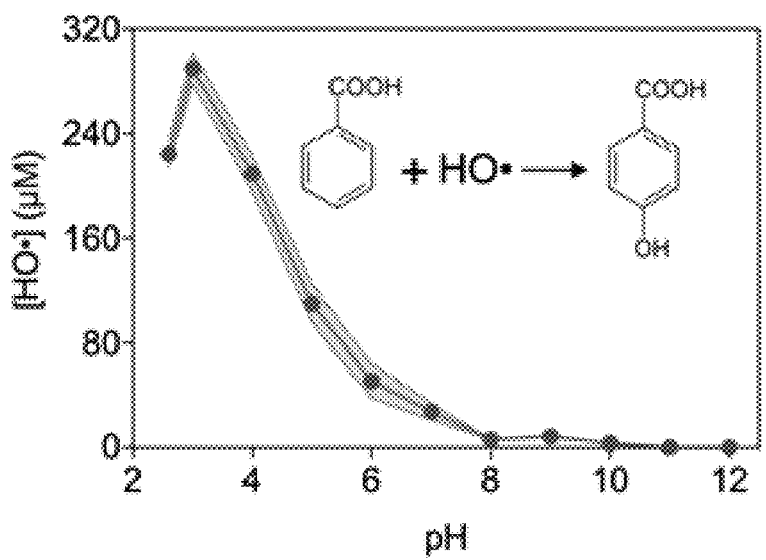
FIG. 16B: Catalytic activity of FeOCl/$Al_2O_3$ composite. Quantification of generated HO. radical by FeOCl/$Al_2O_3$ and $H_2O_2$ reaction at different pH after reaction for 30 min. Inset shows the stoichiometric oxidation of benzoic acid for HO. radical yield determination.

Activity test results of the synthetic FeOCl/Al$_2$O$_3$ composite are shown in FIG. 16. It was found that 10 μM BPA was completely degraded in 10 min by 0.2 g/L of FeOCl/Al$_2$O$_3$ and 10 mM H$_2$O$_2$ at pH 3, while the FeOCl/Al$_2$O$_3$ composite or H$_2$O$_2$ alone led to negligible BPA removals. Further, under the stated conditions, FeOCl/Al$_2$O$_3$-mediated Fenton-like reaction produced the most remarkable amount of HO. radicals at pH 3 (i.e., 289.8 μM after reaction for 30 min), which acidity could be readily achieved by the Ella process. The catalytic performance of the FeOCl/Al$_2$O$_3$ composite showed a consistent pattern with that of the unimmobilized FeOCl nanoparticle (FIG. 4), indicating that the γ-Al$_2$O$_3$ support played no role in H$_2$O$_2$ transformation.

Example 2. High Performance of the Electro-Fenton-Like Platform

Figure 17A:
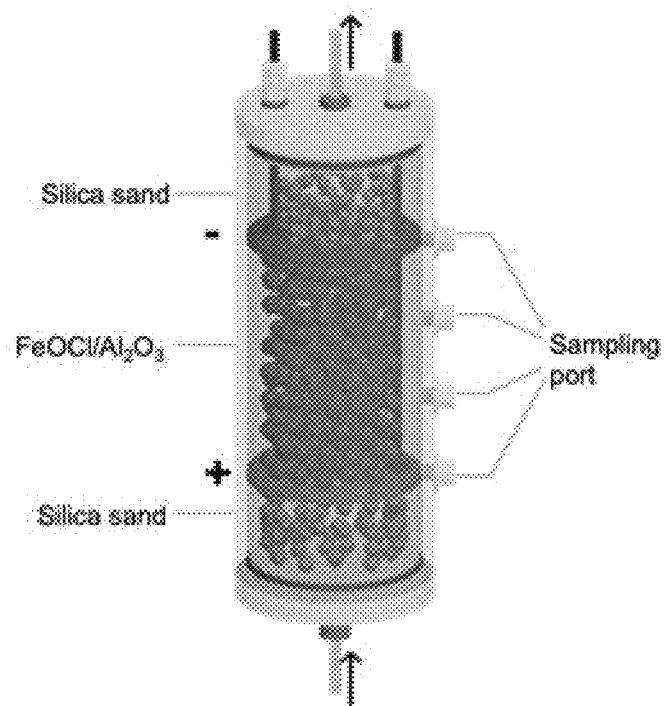
FIG. 17A: Illustration of column device components of electro-Fenton-like platform. Arrows indicate flow direction. "+" and "−" denote anode and cathode, respectively.
Figure 17B:
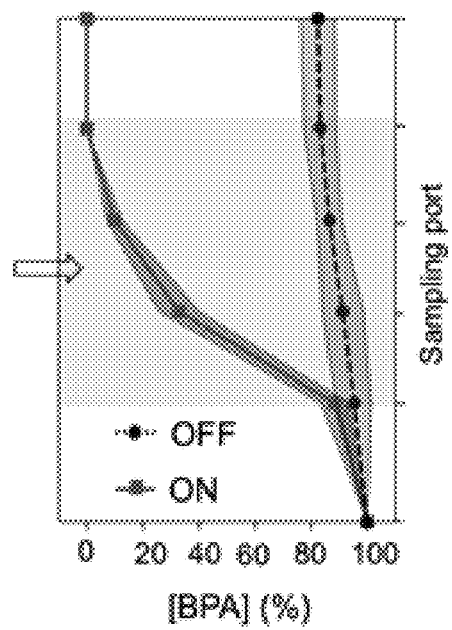
FIG. 17B: BPA removals from each sampling port of electro-Fenton-like platform.
Figure 17C:
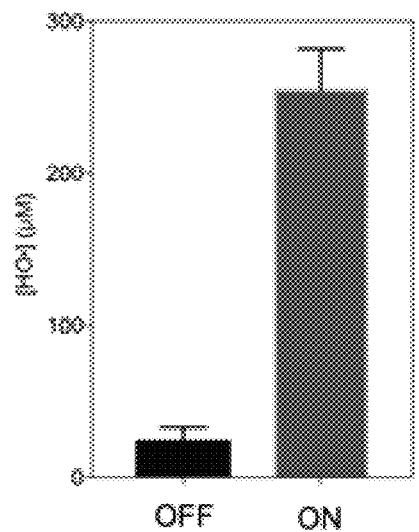
Figure 19:
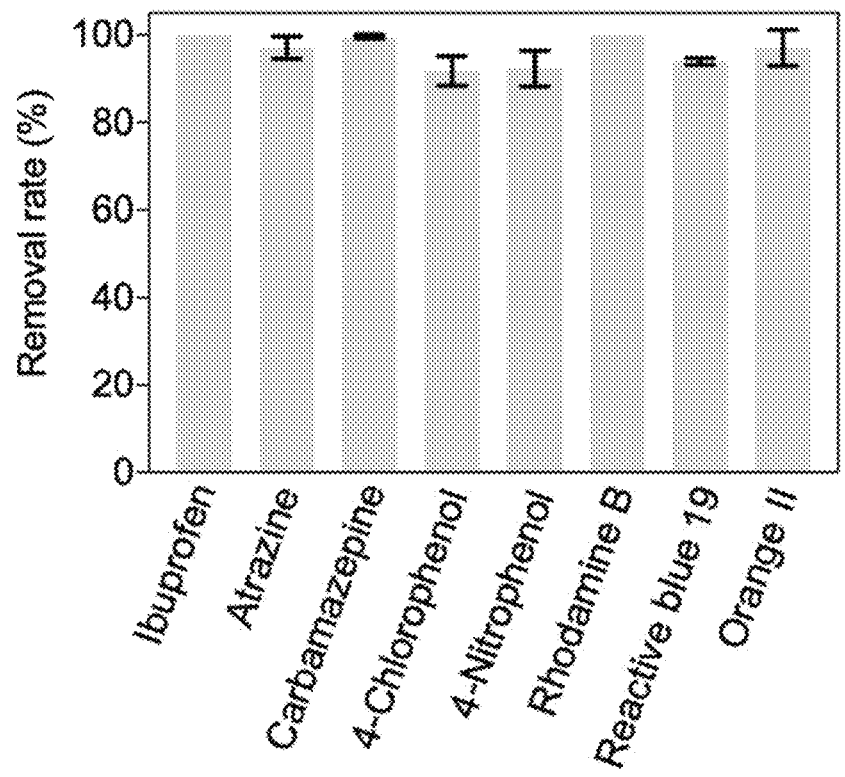
FIG. 19: Degradation of recalcitrant organic contaminants by the developed electro-Fenton-like water treatment platform. Initial concentration of these compounds was 10 μM.

The synthetic FeOCl/Al$_2$O$_3$ composites were transferred to the space between electrodes of the column, in order to utilize the acidity produced by the Ella process (FIG. 17A). Neutral solutions containing 10 mM H$_2$O$_2$ oxidant and 10 μM BPA contaminant were pumped through the column at a rate of 15 mL/min, and BPA removals along the hydraulic flux direction were measured (FIG. 17B). Low BPA removal from the effluent (17.6%) was observed without electric current, due to the weak activity of FeOCl/Al$_2$O$_3$ under neutral condition. However, after a 100 mA electric current was applied to electrodes, gradual degradation of BPA took place as measured from the sampling ports, and BPA removal reached 100% in the effluent. Direct BPA degradation by electrodes was ruled out based on control experiment (FIG. 18). Additionally, the presence of 10 mM ethanol as HO. radical scavenger almost fully quenched BPA removal (FIG. 18), suggesting that in situ produced HO. radicals accounted for BPA degradation. As shown in FIG. 19, the HO. radicals generated by the EFL platform could also non-selectively degrade other organic contaminants including drugs (ibuprofen and carbamazepine), herbicide (atrazine), pesticide and drug precursors (4-chlorophenol and 4-nitrophenol), and recalcitrant dyes (rhodamine B, reactive blue 19, and orange II). It was further determined that the yield of HO. radical produced by the platform when 100 mA electric current was turned off and on was 23.5 and 254.4 μM, respectively (FIG. 17C). This 10.8-fold increase in HO. radical production was attributed to the acidic environment created by the Ella process which boosted FeOCl/Al$_2$O$_3$ catalyst activity. Results indicate that the EFL platform by coupling a heterogeneous Fenton-like catalyst and the Ella process in a flow-through column device is effective for removal of organic contaminants.

Figure 17D:
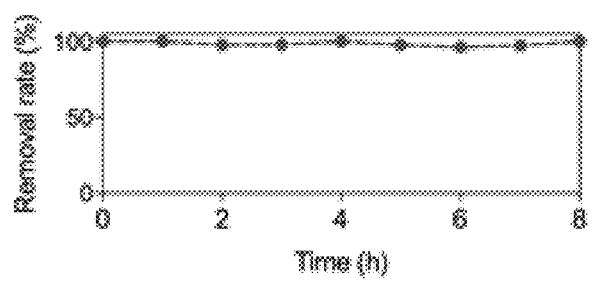
FIG. 17D: Stability test of electro-Fenton-like platform.
Figure 17E:
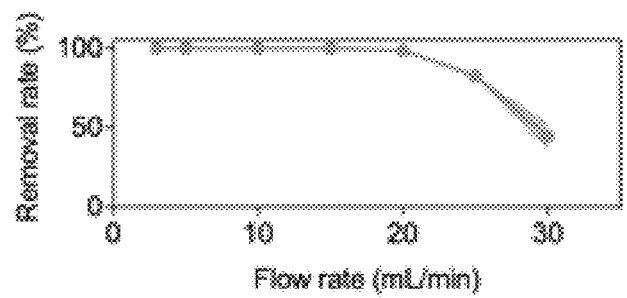
FIG. 17E: Tolerance of flow rate of electro-Fenton-like platform. Influent flow rate was subjected to change.

The long-term stability of BPA removal by the EFL platform was tested (FIG. 17D). Over the course of 8-h reactions, laminar fluid transport was maintained, and the BPA removal steadily approached 100%. BPA removal by this platform under different hydraulic flow rates was also measured (FIG. 17E). A high flow rate leads to shortened contact time among H$_2$O$_2$ molecules, the catalyst surface, and the organic contaminant, which reduces HO. radical yield and compromises contaminant removal. Over 95% of 10 μM BPA could be removed from the effluent at a flow rate of less than 20 mL/min, whereas BPA removal rate decreased to 82.4% and 44.4% at 25 and 30 mL/min, respectively. The tolerance of flow rate by using FeOCl/Al$_2$O$_3$ in this design was greatly superior than that by using FeOCl crosslinked on alginate hydrogel as a catalyst (FIG. 12), primarily due to the abundant catalytic sites exposed on the surface of the FeOCl/Al$_2$O$_3$ composite.

Figure 17F:
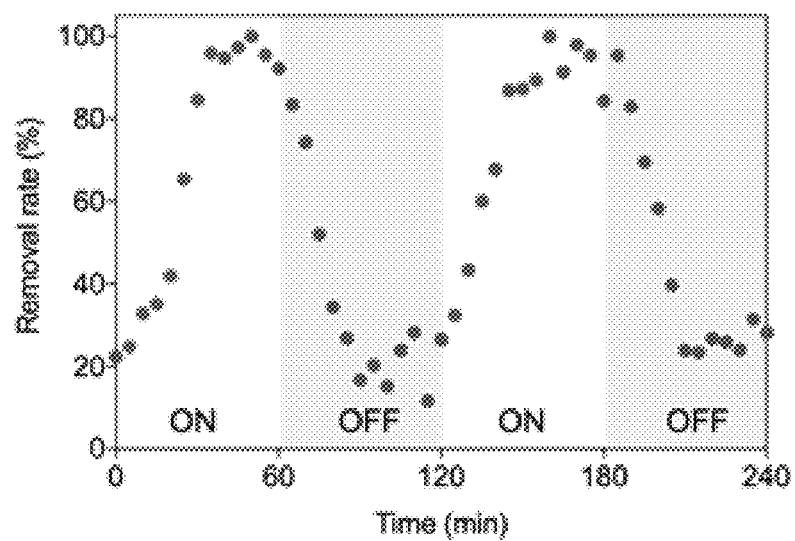
FIG. 17F: Electricity responsiveness assay of the electro-Fenton-like platform.

Responsiveness of BPA removal by the EFL platform to electric current was monitored by repeatedly turning the electric power supply on and off with a 60-min interval. As shown in FIG. 17F, BPA removal significantly increased after the 100 mA electric current was turned on for 15 min, and approached 100% after 40 min. As the power was turned off, BPA removal gradually decreased during the first 30 min, from 84.3-92.3% to 16.7-23.9%, and was steady afterwards. The non-instant response of BPA removal to electricity was presumably because of the slow accumulation and desorption of protons. Results demonstrated that electricity is a critical governor of contaminant removal by our developed platform. In addition, the observed response time in this study matches well with the intermittency of solar and wind electricity, and therefore our device can potentially provide clean drinking water without the need for battery energy storage.

Figure 20A:
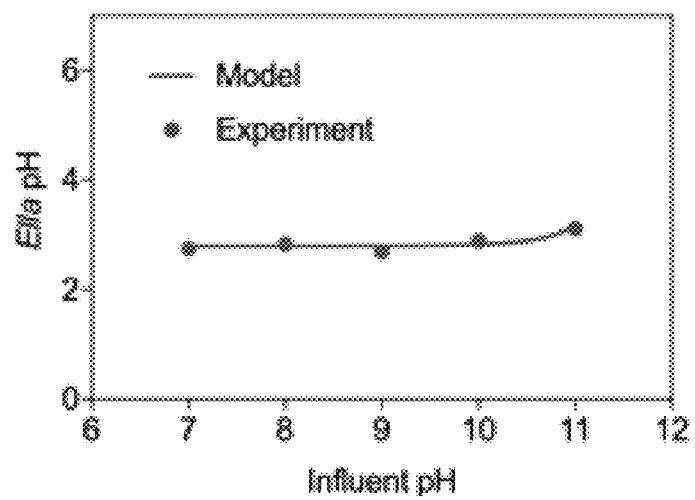
FIG. 20A: Robustness of electro-Fenton-like platform against complex water chemistry. Acidic pH produced by Ella process. Influents were adjusted to different initial pH. Ella pH denotes the average of solution pHs from two middle sampling ports.
Figure 20B:
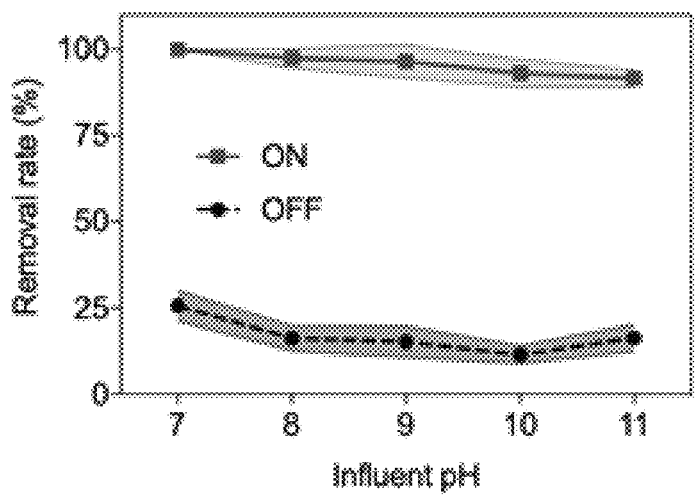
FIG. 20B: BPA removals when the electric current was turned off and on BPA removals when the electric current was turned off and on. Influents were adjusted to different initial pH. Ella pH denotes the average of solution pHs from two middle sampling ports.

Complex water environments are typically encountered in water treatment practices, posing challenges to downgradient treatment. For instance, water bodies receiving leachates from industries could be highly basic and require a pH neutralization process such as CO$_2$ sequestration before biological/chemical treatment (Gomes et al. 2016). In this study, contaminants in a synthetic basic solution are treated by the EFL platform. Influent solutions of pH 7-11 were effectively acidified to around pH 3 under 100 mA electric current and 15 mL/min flow rate, in good agreement with modeling results (FIG. 20A). Consequently, BPA removals approached 100% under the Ella process-mediated acidic environment regardless of influent pH, whereas less than 22.4% of BPA was removed when the electric current was turned off (FIG. 20B).

Figure 20C:
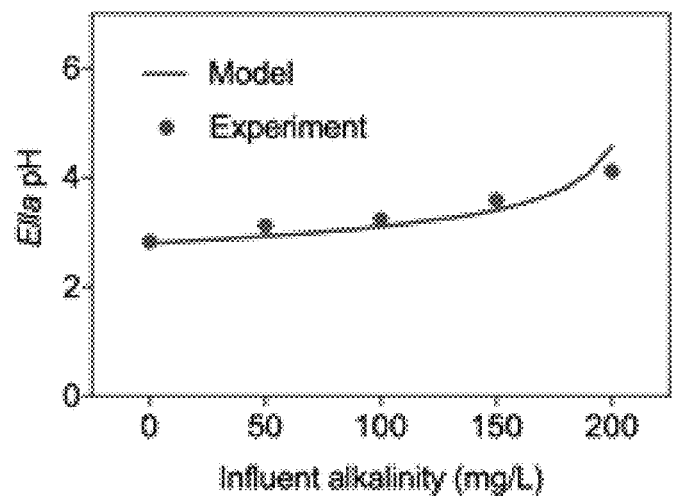
FIG. 20C: Robustness of electro-Fenton-like platform against complex water chemistry. (Acidic pH produced by Ella process. Sodium carbonate was added to influents for synthetic alkalinity and influents were maintained neutral.
Figure 20D:
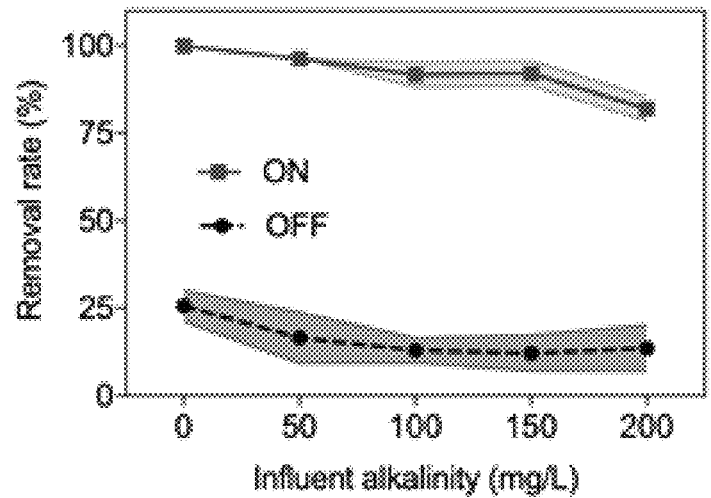
FIG. 20D: BPA removals when the electric current was turned off and on BPA removals when the electric current was turned off and on. Sodium carbonate was added to influents for synthetic alkalinity and influents were maintained neutral.

The potential of water bodies to neutralize protons, namely water alkalinity, represents another challenge for acid-demanding chemical treatments due to the buffering carbonate ions, expressed as equivalent mg $CaCO_3$/L (Lahay et al. 2007). Specifically, a substantial amount of acid is required to overcome high water alkalinity for the conventional Fenton process. BPA removal in synthetic solutions containing 0-200 mg $CaCO_3$/L water alkalinity were tested by the EFL platform. Results show that, solution of higher alkalinity was less prone to acidification by the Ella process, but the acidic zone was still below pH 4.14 in all tests under 100 mA electric current and 15 mL/min flow rate (FIG. 20C). This acidity led to an 84.5%-100% removal efficiency of BPA, significantly higher than that when electric current was turned off (FIG. 20D). The acidity produced by the Ella process could be tuned against water buffering capacity by adjusting applied electric current and hydraulic flow rate. For instance, a combination of 60 mA electric current and 2 mL/min flow rate is able to acidify a solution of 500 mg $CaCO_3$/L alkalinity from pH 8 to pH 3.5 (Yuan et al. 2013).

Example 3. Test with Field Water Samples

Figure 21:
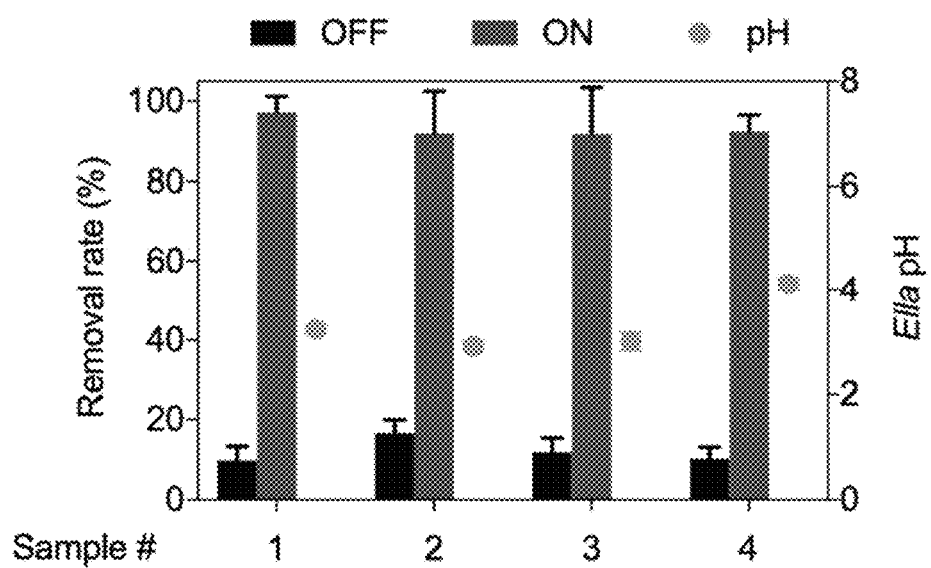
FIG. 21: BPA removals when the electric current was turned off and on BPA removals when the electric current was turned off and on. Sodium carbonate was added to influents for synthetic alkalinity and influents were maintained neutral.

The results demonstrate the effectiveness of the EFL platform in synthetic solutions of complex water chemistry. Furthermore, in this study, water samples extracted in the field from surface or groundwater sources were used as the matrices for BPA removal with intrinsic conductivity supporting electrochemical water splitting. Water quality characteristics are shown in Table 2. Treated water bodies were acidified to pH 2.9-4.04 by the Ella process, and 91.7 to 97.2% BPA removals were achieved by the mediated Fenton-like process (FIG. 21).

Example 4. Techno-Economic Analysis

Compared with the conventional Fenton process, the required energy for electrochemical water splitting by this integral EFL platform is estimated to be 1.39 kWh/m$^3$ influent, which translates into a cost of $0.091/m$^3$ based on the average US industrial electricity rate ($0.0653/kWh) (Average Price of Electricity to Ultimate Customers by End-Use Sector, 2020). This value is subjected to optimization based on applied electric current, hydraulic flow rate, and solution conductivity, but it only constitutes around 10% of unit operating cost by modern water treatment plants (Guo et al. 2014). Besides, the cost of $\gamma$-$Al_2O_3$ and $FeCl_3 \cdot 6H_2O$ is estimated as $0.5/kg (Aluminum Oxide Price, 2020) and $0.3/kg (Ferric Chloride Price, 2020), respectively. This means it takes less than $0.0005 to synthesize 1 g of FeOCl/$Al_2O_3$ catalyst, and we used ~50 g of synthesized catalyst particles for our device. By considering the long-term stability of this catalyst, its cost is indeed negligible. Furthermore, in situ electrochemical synthesis of highly concentrated $H_2O_2$ (Chen et al. 2017; Yamanaka et al. 2003) could be used as a replacement of externally supplied $H_2O_2$ in the future, further reducing the overall chemical cost.

Moreover, the EFL water treatment platform developed in this study is applied to practical implementation after upscaling. The fast response of the EFL platform in removing organic pollutants especially allows for smart controls at low cost. In addition, it possesses the easy-to-(un)install feature that makes it affordable and compatible with other connecting units of a centralized water treatment facility. For instance, a feasible niche of this device is to function as an electrochemical filter before advanced purification units requiring removal of fouling hazards such as organic molecules and biofilm-forming bacteria (Guo et al. 2011; Zhou et al. 1990). On the small size end, the EFL platform is designed to provide clean drinking water for individual families without electrical grid, by coupling with cheap photovoltaic sources.

DISCUSSION

An electro-Fenton-like (EFL) platform wherein an electrochemically produced acidic environment supports heterogeneous Fenton-like reaction was developed for high throughput water treatment of contaminated water. The acidic pH produced by the Ella process (100 mA electric current and 15 mL/min flow rate) mediated a 10.8-fold increase in HO. yield, which contributed to the complete removal of contaminants in the effluent. The EFL platform showed strong stability for long-term use, tolerance of high water flux, and effectiveness against complex water chemistry for organic contaminant removal. The setup configuration is advantageous in that it provides high degree of automation that enables water treatment by controlling the electric power, and low operating cost that most modern water treatment plants strive for, both of which are especially attractive for industrial applications.

The Ella process displays a small footprint because it turns neutral influent into acidic solution in between electrodes, and zones beyond that are neutral as the influent. Combined with heterogeneous Fenton-like catalysts, Ella process showed excellent performance under long-term use, high flow rate, and complex water chemistry, manifesting the robustness of this coupled platform for recalcitrant organic compounds removal.

REFERENCES CITED

Acar, Y. B., Alshawabkeh, A. N. Principles of electrokinetic remediation. *Environ. Sci. Technol.* 27, 2638-2647 (1993).

Adams, G. E., Boag, J. W. & Michael, B. D. Reactions of the hydroxyl radical. Part 2.-Determination of absolute rate constants. *Trans. Faraday Soc.* 61, 1417-1424 (1965).

Aluminum Oxide Price [online], available from <https://www.intratec.us/chemical-markets/aluminum-oxide-price>. retrieved September 2020.

André, R. et al. $V_2O_5$ nanowires with an intrinsic peroxidase-like activity. *Adv. Funct. Mater.* 21, 501-509 (2011).

Asati, A., Santra, S., Kaittanis, C., Nath, S. & Perez, J. M. Oxidase-like activity of polymer-coated cerium oxide nanoparticles. *Angew. Chem. Int. Ed.* 121, 2344-2348 (2009).

Babuponnusami, A. & Muthukumar, K. A review on Fenton and improvements to the Fenton process for wastewater treatment. *J. Environ. Chem. Eng.* 2, 557-572 (2014).

Bokare, A. D. & Choi, W. Review of iron-free Fenton-like systems for activating $H_2O_2$ in advanced oxidation processes. *J Hazard. Mater.* 275, 121-135 (2014).

Bolobajev, J. et al. Reuse of ferric sludge as an iron source for the Fenton-based process in wastewater treatment. *Chem. Eng. J.* 255, 8-13 (2014).

Brillas, E., Sirés, I. & Oturan, M. A. Electro-Fenton process and related electrochemical technologies based on Fenton's reaction chemistry. *Chem. Rev.* 109, 6570-6631 (2009).

Cai, R. et al. Single nanoparticle to 3D supercage: framing for an artificial enzyme system. *J. Am. Chem. Soc.* 137, 13957-13963 (2015).

Cai, S. et al. $Pt74Ag_{26}$ nanoparticle-decorated ultrathin $MoS_2$ nanosheets as novel peroxidase mimics for highly selective colorimetric detection of $H_2O_2$ and glucose. *Nanoscale* 8, 3685-3693 (2016).

Cai, S. et al. Single-layer Rh nanosheets with ultrahigh peroxidase-like activity for colorimetric biosensing. *Nano Res.* 11, 6304-6315 (2018).

Chen, Z. et al. Development of a reactor with carbon catalysts for modular-scale, low-cost electrochemical generation of $H_2O_2$. *React. Chem. Eng.* 2, 239-245 (2017).

Chen, T. M., Wu, X. J., Wang, J. X. & Yang, G. W. $WSe_2$ few layers with enzyme mimic activity for high-sensitive and high-selective visual detection of glucose. *Nanoscale* 9, 11806-11813 (2017).

Cheng, M. et al. Metal-organic frameworks for highly efficient heterogeneous Fenton-like catalysis. *Coord Chem. Rev.* 368, 80-92 (2018).

Clark, S. J. et al. First principles methods using CASTEP. *Z. Kristallogr Cryst. Mater.* 220, 567-570 (2005).

Davis, E. M. & Davis, R. J. Fundamentals of Chemical Reaction Engineering. *Journal of Chemical Education* (Vol. 43, 2003). New York, N: McGraw-Hill Higher Education.

Deng, H. et al. Monodisperse magnetic single-crystal ferrite microspheres. *Angew. Chem. Int. Ed.* 44, 2782-2785 (2005).

De Smedt, F. & Wierenga, P. J. Solute transfer through columns of glass beads. *Water Resources Res.* 20, 225-232 (1984).

Ding, Y. et al. FePt—Au ternary metallic nanoparticles with the enhanced peroxidase-like activity for ultrafast colorimetric detection of $H_2O_2$. *Sensor. Actuat. B: Chem.* 259, 775-783 (2018).

Eggenhuisen, T. M., Breejen, J. P. D., Verdoes, D., Jongh, P. E. D. & Jong, K. P. D. Fundamentals of melt infiltration for the preparation of supported metal catalysts. The case of $Co/SiO_2$ for Fischer-Tropsch synthesis. *J. Am. Chem. Soc.* 132, 18318-18325 (2010).

Feng, F., Xu, Z., Li, X., You, W. & Zhen, Y. Advanced treatment of dyeing wastewater towards reuse by the combined Fenton oxidation and membrane bioreactor process. *J. Environ. Sci.* 22, 1657-1665 (2010).

Ferric Chloride Price [online], available from <https://www.icis.com/explore/resources/news/2001/08/27/145944/us-ferric-chloride-producers-raise-prices-in-healthy-market/>, retrieved September 2020.

Ganiyu, S. O., Van Hullebusch, E. D., Cretin, M., Esposito, G. & Oturan, M. A. Coupling of membrane filtration and advanced oxidation processes for removal of pharmaceutical residues: a critical review. *Sep. Purif. Technol.* 156, 891-914 (2015).

Ganiyu, S. O., Zhou, M. & Martinez-Huitle, C. A. Heterogeneous electro-Fenton and photoelectro-Fenton processes: a critical review of fundamental principles and application for water/wastewater treatment. *Appl. Catal., B.* 235, 103-129 (2018).

Garrido-Ramirez, E. G., Theng, B. K. G. & Mora, M. L. Clays and oxide minerals as catalysts and nanocatalysts in Fenton-like reactions—a review. *Appl. Clay Sci.* 47, 182-192 (2010).

Gao, L. et al. Intrinsic peroxidase-like activity of ferromagnetic nanoparticles. *Nat. Nanotechnol.* 2, 577-583 (2007).

Gao, W. et al. Membrane fouling control in ultrafiltration technology for drinking water production: a review. *Desalination* 272, 1-8 (2011).

Gomes, H. I., Mayes, W. M., Rogerson, M., Stewart, D. I. & Burke, I. T. Alkaline residues and the environment: a review of impacts, management practices and opportunities. *J. Clean. Prod.* 112, 3571-3582 (2016).

Guo, W., Ngo, H. H. & Li, J. A mini-review on membrane fouling. *Bioresour. Technol.* 122, 27-34 (2012).

Guo, T., Englehardt, J. & Wu, T. Review of cost versus scale: water and wastewater treatment and reuse processes. *Wat. Sci. Tech.* 69, 223-234 (2014).

He, Y et al. Microwave-Assisted Fabrication of Bimetallic PdCu Nanocorals with Enhanced Peroxidase-Like Activity and Efficiency for Thiocyanate Sensing. *ACS Appl. Nano Mater.* 1, 2397-2405 (2018).

Herney-Ramirez, J., Vicente, M. A. & Madeira, L. M. Heterogeneous photo-Fenton oxidation with pillared clay-based catalysts for wastewater treatment: a review. *Appl. Catal., B.* 98, 10-26 (2010).

Hojabri, S., Rajic, L. & Alshawabkeh, A. N. Transient reactive transport model for physico-chemical transformation by electrochemical reactive barriers. *J. Hazard. Mater.* 358, 171-177 (2018).

Hu, L. et al. Copper nanoclusters as peroxidase mimetics and their applications to $H_2O_2$ and glucose detection. *Anal. Chico. Acta* 762, 83-86 (2013).

Jiang, T., Song, Y., Du, D., Liu, X. & Lin, Y. Detection of $p_{53}$ protein based on mesoporous Pt—Pd nanoparticles with enhanced peroxidase-like catalysis. *ACS Sensors* 1, 717-724 (2016).

Ji, X. X., Wang, H. F. & Hu, P. J. First principles study of Fenton reaction catalyzed by FeOCl: reaction mechanism and location of active site. *Rare Metals* 38, 783-792 (2019).

Keith, D. C. et al. Geochemical models of the impact of acidic groundwater and evaporative sulfate salts on Boulder Creek at Iron Mountain, Calif. *Appl. Geochem.* 16, 947-961 (2001).

Kim, M. C., Lee, D., Jeong, S. H., Lee, S. Y. & Kang, E. Nanodiamond—Gold Nanocomposites with the Peroxidase-Like Oxidative Catalytic Activity. *ACS Appl. Mater. Interfaces* 8, 34317-34326 (2016).

Koppenol, W. H. The Haber-Weiss cycle-70 years later. *Redox Rep.* 6, 229-234 (2001).

Lahav, O. & Birnhack, L. Quality criteria for desalinated water following post-treatment. *Desalination* 207, 286-303 (2007).

Lin, T. et al. Visual detection of blood glucose based on peroxidase-like activity of $WS_2$ nanosheets. *Biosens. Bioelectron.* 62, 302-307 (2014).

Lin, T., Zhong, L., Guo, L., Fu, F. & Chen, G. Seeing diabetes: visual detection of glucose based on the intrinsic peroxidase-like activity of $MoS_2$ nanosheets. *Nanoscale* 6, 11856-11862 (2014).

Lin, L. et al. Intrinsic peroxidase-like catalytic activity of nitrogen-doped graphene quantum dots and their application in the colorimetric detection of $H_2O_2$ and glucose. *Anal. Chico. Acta* 869, 89-95 (2015).

Liu, S., Lu, F., Xing, R. & Zhu, J. J. Structural effects of $Fe_3O_4$ nanocrystals on peroxidase-like activity. *Chem.: Eur. J.* 17, 620-625 (2011).

Liu, Y, Zhu, G., Yang, J., Yuan, A. & Shen, X. Peroxidase-like catalytic activity of $Ag_3PO_4$ nanocrystals prepared by a colloidal route. *PloS one* 9, e109158 (2014).

Liu, F. et al. Cu-hemin metal-organic frameworks with peroxidase-like activity as peroxidase mimics for colorimetric sensing of glucose. *J. Nanopart. Res.* 18, 106 (2016).

Lu, L. et al. Wastewater treatment for carbon capture and utilization. *Nat. Sustain.* 1, 750-758 (2018).

Ma, M. et al. Size dependence of specific power absorption of $Fe_3O_4$ particles in AC magnetic field. *J. Magn. Magn. Mater.* 268, 33-39 (2004).

Ma, M., Zhang, Y. & Gu, N. Peroxidase-like catalytic activity of cubic Pt nanocrystals. *Colloids Surf A* 373, 6-10 (2011).

Moon, G. H. et al. Eco-friendly photochemical production of $H_2O_2$ through $O_2$ reduction over carbon nitride frameworks incorporated with multiple heteroelements. *ACS Catal.* 7, 2886-2895 (2017).

Mu, J., Wang, Y., Zhao, M. & Zhang, L. Intrinsic peroxidase-like activity and catalase-like activity of $Co_3O_4$ nanoparticles. *Chem. Comm.* 48, 2540-2542 (2012).

Mu, J., Li, J., Zhao, X., Yang, E. C. & Zhao, X. J. Novel urchin-like $Co_9S_8$ nanomaterials with efficient intrinsic peroxidase-like activity for colorimetric sensing of copper (II) ion. *Sensor. Actuat. B: Chem.* 258, 32-41 (2018).

Munoz, M., De Pedro, Z. M., Casas, J. A. & Rodriguez, J. J. Preparation of magnetite-based catalysts and their application in heterogeneous Fenton oxidation—a review. *Appl. Catal.*, B. 176, 249-265 (2015).

Nardi, A., Idiart, A., Trinchero, P., De Vries, L. M., & Molinero, J. Interface COMSOL-PHREEQC (iCP), an efficient numerical framework for the solution of coupled multiphysics and geochemistry. *Comput. Geosci.* 69, 10-21 (2014).

Neyens, E. & Baeyens, J. A review of classic Fenton's peroxidation as an advanced oxidation technique. *J. Hazard. Mater.* 98, 33-50 (2003).

Nordstrom, D. K. & Alpers, C. N. Negative pH, efflorescent mineralogy, and consequences for environmental restoration at the Iron Mountain Superfund site, California. *Proc. Natl. Acad. Sci. U.S.A.* 96, 3455-3462 (1999).

Parkhurst, D. L. & Appelo, C. A. J. PHREEQC (Version 3)—A Computer Program for Speciation, Batch-Reaction, One-Dimensional Transport, and Inverse Geochemical Calculations. In Modeling Techniques, book 6 (p. 497). (2013).

Pariona, N., Herrera-Trejo, M., Oliva, J. & Martinez, A. I. Peroxidase-like activity of ferrihydrite and hematite nanoparticles for the degradation of methylene blue. *J. Nanomater.* 2016, U.S. Pat. No. 3,427,809 (2016).

Paz-Garcia, J. M., Villén-Guzman, M., Garcia-Rubio, A., Hall, S., Ristinmaa, M. & Cesar, G.-L. A Coupled Reactive-Transport Model for Electrokinetic Remediation. In A. B. Ribeiro, E. P. Mateus, & N. Couto (Eds.), Electrokinetics Across Disciplines and Continents (pp. 251-278). Cham: Springer International Publishing. (2016).

Peng, Y. et al. Size- and shape-dependent peroxidase-like catalytic activity of $MnFe_2O_4$ nanoparticles and their applications in highly efficient colorimetric detection of target cancer cells. *Dalton Trans.* 44, 12871-12877 (2015).

Pignatello, J. J., Oliveros, E. & MacKay, A. Advanced oxidation processes for organic contaminant destruction based on the Fenton reaction and related chemistry. *Crit. Rev. Environ. Sci. Technol.* 36, 1-84 (2006).

Pliego, G., Zazo, J. A., Blasco, S., Casas, J. A. & Rodriguez, J. J. Treatment of highly polluted hazardous industrial wastewaters by combined coagulation-adsorption and high-temperature Fenton oxidation. *Ind. Eng. Chem. Res.* 51, 2888-2896 (2012).

Pouran, S. R., Raman, A. A. A. & Daud, W. M. A. W. Review on the application of modified iron oxides as heterogeneous catalysts in Fenton reactions. *J. Clean. Prod.* 64, 24-35 (2014).

Pouran, S. R., Aziz, A. A. & Daud, W. M. A. W. Review on the main advances in photo-Fenton oxidation system for recalcitrant wastewaters. *J. Ind. Eng. Chem.* 21, 53-69 (2015).

Qin, F. X. et al. Hemin@metal-organic framework with peroxidase-like activity and its application to glucose detection. *Catal. Sci. Technol.* 3, 2761-2768 (2013).

Qu, K., Shi, P., Ren, J. & Qu, X. Nanocomposite incorporating $V_2O_5$ nanowires and gold nanoparticles for mimicking an enzyme cascade reaction and its application in the detection of biomolecules. *Chem.: Eur. J.* 20, 7501-7506 (2014).

Segall, M. D. et al. First-principles simulation: ideas, illustrations and the CASTEP code. *J. Phys.: Condens. Matter* 14, 2717-2744 (2002).

Smidsrød, O. & Skja, G. Alginate as immobilization matrix for cells. *Trends Biotechnol.* 8, 71-78 (1990).

Song, Y, Qu, K., Zhao, C., Ren, J. & Qu, X. Graphene oxide: intrinsic peroxidase catalytic activity and its application to glucose detection. *Adv. Mater.* 22, 2206-2210 (2010).

Steefel, C. I. & Lasaga, A. C. A coupled model for transport of multiple chemical species and kinetic precipitation/dissolution reactions with application to reactive flow in single phase hydrothermal systems. *Am. J. Sci.* 294, 529-592 (1994).

Sun, C. et al. Fabrication of an inorganic-organic hybrid based on an iron-substituted polyoxotungstate as a peroxidase for colorimetric immunoassays of $H_2O_2$ and cancer cells. *J. Mater. Chem. A* 1, 4699-4705 (2013).

Sun, M. et al. Reinventing Fenton chemistry: iron oxychloride nanosheet for pH-insensitive $H_2O_2$ activation. *Environ. Sci. Tech. Let.* 5, 186-191 (2018).

Thomas, N. et al. Heterogeneous Fenton catalysts: A review of recent advances. *Journal of Hazardous Materials* 404, 124082 (2021).

US Average Price of Electricity to Ultimate Customers by End-Use Sector [online], <. https://www.eia.gov/electricity/monthly/epm_table_grapher.php?t=epmt_5_6_a>, retrieved April 2020.

Vandenberg, L. N., Hauser, R., Marcus, M., Olea, N. & Welshons, W. V. Human exposure to bisphenol A (BPA). *Reproductive Toxicol.* 24, 139-177 (2007).

Versteeg, H. K. & Malalasekera, W., 2007. An introduction to computational fluid dynamics: the finite volume method. Pearson education.

Wang, J., Han, D., Wang, X., Qi, B. & Zhao, M. Polyoxometalates as peroxidase mimetics and their applications in $H_2O_2$ and glucose detection. *Biosens. Bioelectron.* 36, 18-21 (2012).

Wang, Q. et al. The peroxidase-like catalytic activity of ferrocene and its application in the biomimetic synthesis of microsphere polyaniline. *New J. Chem.* 42, 13536-13540 (2018).

Wang, S., Xu D. et al. Ultrathin ZIF-67 nanosheets as a colorimetric biosensing platform for peroxidase-like catalysis. *Anal. Bioanal. Chem.* 410, 7145-7152 (2018).

Wang, C., Gao, J. & Tan, H. Integrated Antibody with Catalytic Metal-Organic Framework for Colorimetric Immunoassay. *ACS Appl. Mater. Interfaces* 10, 25113-25120 (2018).

Wardman, P. Reduction Potentials of One-Electron Couples Involving Free Radicals in Aqueous Solution *J. Phys. Chem.* Ref. Data 18, 1637-1755 (1989).

Wu, Y. et al. Transformation of pollutants in landfill leachate treated by a combined sequence batch reactor, coagulation, Fenton oxidation and biological aerated filter technology. *Process Saf Environ.* 89, 112-120 (2011).

Wu, X., Chen, T., Wang, J. & Yang, G. Few-layered $MoSe_2$ nanosheets as an efficient peroxidase nanozyme for highly sensitive colorimetric detection of $H_2O_2$ and xanthine. *J. Mater. Chem.* B 6, 105-111 (2018).

Yamanaka, I., Onizawa, T., Takenaka, S. & Otsuka, K. Direct and continuous production of hydrogen peroxide with 93% selectivity using a fuel-cell system. *Angew Chem. Int. Ed.* 42, 3653-3655 (2003).

Yang, X. J., Xu, X. M., Xu, J. & Han, Y F. Iron oxychloride (FeOCl): an efficient Fenton-like catalyst for producing hydroxyl radicals in degradation of organic contaminants. *J. Am. Chem. Soc.* 135, 16058-16061 (2013).

Ye, H. et al. Peroxidase-like properties of Ruthenium nanoframes. *Sci. Bull.* 61, 1739-1745 (2016).

Yi, Y, Wang, L., Li, G. & Guo, H. A review on research progress in the direct synthesis of hydrogen peroxide from hydrogen and oxygen: noble-metal catalytic method, fuel-cell method and plasma method. *Catal. Sci. Technol.* 6, 1593-1610 (2016).

Yuan, S., Chen, M., Mao, X. & Alshawabkeh, A. N. A three-electrode column for Pd-catalytic oxidation of TCE in groundwater with automatic pH-regulation and resistance to reduced sulfur compound foiling. *Water Res.* 47, 269-278 (2013).

Zeb, A. et al. Intrinsic peroxidase-like activity and enhanced photo-Fenton reactivity of iron-substituted polyoxometallate nanostructures. *Dalton Trans.* 47, 7344-7352 (2018).

Zhang, X. Z., Zhou, Y, Zhang, W., Zhang, Y. & Gu, N. Polystyrene@Au@prussian blue nanocomposites with enzyme-like activity and their application in glucose detection. *Colloids Surf A* 490, 291-299 (2016).

Zheng, H. Q. et al. MOF-808: A Metal-Organic Framework with Intrinsic Peroxidase-Like Catalytic Activity at Neutral pH for Colorimetric Biosensing. *Inorg. Chem.* 57, 9096-9104 (2018).

Zhou, X. & Mopper, K. Determination of photochemically produced hydroxyl radicals in seawater and freshwater. *Mar. Chem.* 30, 71-88 (1990).

INCORPORATION BY REFERENCE

All of the U.S. patents and U.S. and PCT published patent applications cited herein are hereby incorporated by reference.

EQUIVALENTS

The foregoing written specification is considered to be sufficient to enable one skilled in the art to practice the invention. The present invention is not to be limited in scope by examples provided, since the examples are intended as a single illustration of one aspect of the invention and other functionally equivalent embodiments are within the scope of the invention. Various modifications of the invention in addition to those shown and described herein will become apparent to those skilled in the art from the foregoing description and fall within the scope of the appended claims. The advantages and objects of the invention are not necessarily encompassed by each embodiment of the invention.

What is claimed is:

1. A process for treating contaminated water, comprising contacting said contaminated water with hydrogen peroxide in the presence of an iron oxychloride catalyst, and subsequently applying an electric current to the contaminated water, wherein the process occurs in the absence of an additional acid, and the iron oxychloride catalyst is a $FeOCl/Al_2O_3$ composite.

2. The process of claim 1, wherein the electric current is about 100 mA.

3. The process of claim 1, wherein the contaminated water subjected to the electric current attains a pH of about 2 to about 4.

4. The process of claim 1, wherein the iron oxychloride catalyst is immobilized on a support.

5. The process of claim 4, wherein the iron oxychloride catalyst is immobilized on a $\gamma$-$Al_2O_3$ support.

6. The process of claim 1, wherein the amount of one or more organic contaminants in the water is decreased.

7. The process of claim 6, wherein the one or more contaminants is one or more drugs, drug precursors, plastic precursors, herbicides, pesticides, or recalcitrant dyes.

8. The process of claim 7, wherein the one or more contaminants is bisphenol A (BPA).

9. A process for treating contaminated water, comprising:
   (i) adding hydrogen peroxide to the contaminated water;
   (ii) providing an influent stream of the contaminated water at a flow rate into a chamber comprising an upstream anode, a downstream cathode, and an iron oxychloride catalyst between the anode and cathode;
   (iii) applying an electric current to the chamber to provide an acidic environment in the chamber, thereby treating the contaminated water in the chamber; and
   (iv) collecting an effluent stream of the treated water exiting the chamber;
   wherein the iron oxychloride catalyst is a $FeOCl/Al_2O_3$ composite.

10. The process of claim 9, wherein the influent stream of contaminated water is at about neutral pH; and effluent stream of treated water is at about neutral pH.

11. The process of claim 9, wherein the contaminated water in the chamber is at an acidic pH.

12. The process of claim 11, wherein the pH of the contaminated water in the chamber is about 2 to about 4.

13. The process of claim 9, wherein the electric current is about 100 mA.

14. The process of claim 9, wherein the iron oxychloride catalyst is immobilized on a $\gamma$-$Al_2O_3$ support.

15. The process of claim 9, wherein the hydrogen peroxide is converted to hydroxy radicals inside the chamber.

16. The process of claim 15, wherein the concentration of hydroxy radicals in the chamber during step (iii) is greater than 250 µM.

17. The process of claim 9, wherein the flow rate is about 10 to about 25 mL/min.

18. The process of claim 9, wherein the amount of one or more organic contaminants in the water is decreased, and the one or more contaminants is one or more drugs, drug precursors, plastic precursors, herbicides, pesticides, or recalcitrant dyes.

19. The process of claim 18, wherein the one or more contaminants is bisphenol A (BPA).

20. A process for treating contaminated water, comprising contacting said contaminated water with hydrogen peroxide in the presence of an iron oxychloride catalyst, and subsequently applying an electric current to the contaminated water, wherein the process occurs in the absence of an additional acid; and the electric current is about 100 mA or the concentration of hydroxy radicals in the contaminated water while applying the electric current is greater than 250 μM.

21. A process for treating contaminated water, comprising:
  (i) adding hydrogen peroxide to the contaminated water;
  (ii) providing an influent stream of the contaminated water at a flow rate into a chamber comprising an upstream anode, a downstream cathode, and an iron oxychloride catalyst between the anode and cathode;
  (iii) applying an electric current to the chamber to provide an acidic environment in the chamber, thereby treating the contaminated water in the chamber; and
  (iv) collecting an effluent stream of the treated water exiting the chamber;
  wherein the electric current is about 100 mA or the concentration of hydroxy radicals in the chamber during step (iii) is greater than 250 μM.

* * * * *